(12) United States Patent
Ichikawa

(10) Patent No.: US 11,338,697 B2
(45) Date of Patent: May 24, 2022

(54) VEHICLE-MOUNTABLE CONTROL DEVICE AND CHARGING SYSTEM

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/578,851

(22) Filed: Sep. 23, 2019

(65) Prior Publication Data
US 2020/0101861 A1 Apr. 2, 2020

(30) Foreign Application Priority Data
Sep. 28, 2018 (JP) .............................. JP2018-184546

(51) Int. Cl.
*B60L 53/66* (2019.01)
*B60L 58/12* (2019.01)
*B60L 53/16* (2019.01)

(52) U.S. Cl.
CPC ............... *B60L 53/66* (2019.02); *B60L 53/16* (2019.02); *B60L 58/12* (2019.02)

(58) Field of Classification Search
CPC .......... B60L 53/66; B60L 58/12; B60L 53/16
USPC ....................................................... 320/109
See application file for complete search history.

(56) References Cited

U.S. PATENT DOCUMENTS

| 2006/0097577 | A1* | 5/2006 | Kato | .................. F02N 11/0866 |
| | | | | 307/10.1 |
| 2010/0318250 | A1* | 12/2010 | Mitsutani | ................ B60L 58/24 |
| | | | | 701/22 |
| 2013/0200846 | A1* | 8/2013 | Ang | ........................ B60L 58/20 |
| | | | | 320/109 |
| 2015/0210181 | A1 | 7/2015 | Niioka et al. | |
| 2016/0121735 | A1 | 5/2016 | Sugano | |
| 2020/0101861 | A1* | 4/2020 | Ichikawa | ................ B60L 53/16 |

FOREIGN PATENT DOCUMENTS

| JP | H07-046701 A | 2/1995 |
| JP | 2012085403 A | 4/2012 |
| JP | 2014-230301 A | 12/2014 |
| JP | 2017-127062 A | 7/2017 |
| JP | 2018-125933 A | 8/2018 |
| WO | 2014/045776 A1 | 3/2014 |

\* cited by examiner

*Primary Examiner* — Suresh Memula
(74) *Attorney, Agent, or Firm* — Dinsmore & Shohl LLP

(57) ABSTRACT

A vehicle-mountable control device configured to control a vehicle including a charging port for DC power and an auxiliary device includes a determination unit and an information obtainment unit. The information obtainment unit is configured to obtain prescribed facility information about a power feeding facility. The determination unit is configured to permit an auxiliary device driving mode when it is determined that the power feeding facility corresponds to the auxiliary device driving mode based on the facility information, and not permit the auxiliary device driving mode when it is determined that the power feeding facility does not correspond to the auxiliary device driving mode based on the facility information.

9 Claims, 11 Drawing Sheets

VEHICLE-MOUNTABLE CONTROL DEVICE AND CHARGING SYSTEM

CROSS REFERENCE TO RELATED APPLICATIONS

This nonprovisional application claims priority to Japanese Patent Application No. 2018-184546 filed on Sep. 28, 2018 with the Japan Patent Office, the entire contents of which are hereby incorporated by reference.

BACKGROUND

Field

The present disclosure relates to a vehicle-mountable control device and a charging system.

Description of the Background Art

When a vehicle is at a stop, with a charging port for AC power (hereinafter, also referred to as "AC charging port") of the vehicle connected to a normal charger through a charging cable, an auxiliary device of the vehicle is in some cases brought into a drivable state. For example, according to Japanese Patent Laying-Open No. 2012-85403, receiving electric power supply from a normal charger to an AC charging port and charging a vehicle-mounted battery, with an auxiliary device of a vehicle being in a drivable state as described above, is referred to as "my room charging". The normal charger is a power feeding facility corresponding to an AC power supply method (hereinafter, also referred to as "AC method"), and is placed outside the vehicle.

SUMMARY

The conventional my room charging described in Japanese Patent Laying-Open No. 2012-85403 requires a long time until the completion of charging, when the vehicle-mounted battery is charged by the normal charger. In anticipation of this, the conventional my room charging is configured such that a user can use the auxiliary device during charging by the normal charger.

On the other hand, a quick charger is used for the purpose of charging a vehicle-mounted battery in a short time (i.e., quick charging), and thus, it is undesirable to drive an auxiliary device during charging of the vehicle-mounted battery by the quick charger and prolong the charging time. Therefore, when the vehicle-mounted battery is charged by the quick charger, driving of the auxiliary device is prohibited as a general rule. Not driving an auxiliary device during quick charging even if the driving is permitted in vehicle control, and further, moving a vehicle immediately after the completion of charging are the drivers' manners. The quick charger is a power feeding facility corresponding to a DC power supply method (hereinafter, also referred to as "DC method"), and is placed outside the vehicle. Generally, a current value of the quick charger is not less than 50 A, and a maximum output of a typical example of the quick charger is about 50 kW (rated voltage: 400 V, rated current: 125 A).

A conventional vehicle-mountable control device does not provide for bringing an auxiliary device of a vehicle into a drivable state, with a charging port for DC power (hereinafter, also referred to as "DC charging port") of the vehicle connected to a power feeding facility for the DC method through a charging cable (hereinafter, also referred to as "DC my room mode"). However, if the power feeding facility for the DC method is configured to correspond to the DC my room mode, the convenience of a user (e.g., a driver and a passenger) of the vehicle can be improved without excessively impeding the convenience of a user of another vehicle.

The present disclosure has been made to solve the above-described problem, and an object of the present disclosure is to provide a vehicle-mountable control device that makes it possible to improve the convenience of a user of a vehicle without excessively impeding the convenience of a user of another vehicle, when a vehicle-mounted battery is charged with DC power supplied to a charging port for DC power. Another object of the present disclosure is to provide a charging system including the vehicle-mountable control device.

A vehicle-mountable control device according to the present disclosure is a vehicle-mountable control device configured to control a vehicle including a charging port for DC power and an auxiliary device, and includes: a determination unit; and an information obtainment unit. The determination unit is configured to determine whether or not to permit an auxiliary device driving mode, the auxiliary device driving mode being a mode of bringing a prescribed auxiliary device into a drivable state when a power feeding facility external to the vehicle is connected to the charging port for DC power through a charging cable. The information obtainment unit is configured to obtain prescribed facility information about the power feeding facility. The determination unit is configured to permit the auxiliary device driving mode when it is determined that the power feeding facility corresponds to the auxiliary device driving mode based on the facility information, and not to permit the auxiliary device driving mode when it is determined that the power feeding facility does not correspond to the auxiliary device driving mode based on the facility information.

In the above-described vehicle-mountable control device, the auxiliary device driving mode is permitted when the power feeding facility corresponds to the auxiliary device driving mode at the time of charging of a vehicle-mounted battery with DC power supplied to the charging port for DC power of the vehicle. Therefore, the convenience of a user of the vehicle can be improved. On the other hand, the auxiliary device driving mode is not permitted when the power feeding facility does not correspond to the auxiliary device driving mode. Therefore, impediment of the convenience of a user of another vehicle is suppressed. Thus, according to the above-described vehicle-mountable control device, the convenience of the user of the vehicle can be improved without excessively impeding the convenience of a user of another vehicle.

The facility information may include a magnitude of electric power supplied by the power feeding facility. The determination unit may be configured to determine that the power feeding facility corresponds to the auxiliary device driving mode, when the magnitude of the electric power supplied by the power feeding facility is not more than a prescribed magnitude.

As electric power supplied by a power feeding facility becomes smaller, a charging speed becomes lower. Therefore, a power feeding facility with small electric power supply is not used for quick charging. Thus, in such a power feeding facility, execution of the auxiliary device driving mode during charging would be permitted (not cause a breach of manners), similarly to a normal charger. By using the magnitude of the electric power supplied by the power feeding facility, the determination unit can easily and accurately determine whether or not to permit the auxiliary device driving mode.

The above-described vehicle-mountable control device may further include a request unit configured to request the power feeding facility to decrease the magnitude of the electric power supplied by the power feeding facility to be not more than the prescribed magnitude, when a prescribed request condition is satisfied, the prescribed request condition including a condition that an SOC (State Of Charge) of a battery mounted on the vehicle becomes not less than a prescribed SOC value during charging of the battery with the electric power supplied from the power feeding facility to the charging port for DC power.

By using the SOC of the vehicle-mounted battery as described above, the timing at which the vehicle-mounted battery is fully charged can be detected. Normally, the vehicle-mounted battery being fully charged means that a main purpose of using the power feeding facility is achieved. Therefore, when the vehicle-mounted battery is fully charged, the vehicle enters a state of being movable in accordance with a request from a user of another vehicle. In such a state, the above-described vehicle-mountable control device requests the power feeding facility to decrease the magnitude of the supplied electric power to be not more than the prescribed magnitude (i.e., permits the auxiliary device driving mode). Thus, the convenience of the user of the vehicle can be improved without excessively impeding the convenience of a user of another vehicle.

The facility information may include information indicating whether the power feeding facility is a public facility or a non-public facility. The determination unit may be configured to determine that the power feeding facility corresponds to the auxiliary device driving mode, when the power feeding facility is the non-public facility.

The number of users of the non-public facility (people entitled to use the facility) is small. Therefore, even if the auxiliary device driving mode is permitted for the non-public facility, the possibility of impeding the convenience of a user of another vehicle would be low. The determination unit can easily and accurately determine whether or not to permit the auxiliary device driving mode, based on whether the power feeding facility is the public facility or the non-public facility.

The vehicle may further include a first notification device configured to provide prescribed information. The vehicle-mountable control device may further include a notification unit configured to cause the first notification device to provide a notification that the auxiliary device driving mode cannot be executed, when the determination unit determines not to permit the auxiliary device driving mode.

In the above-described vehicle-mountable control device, the notification that the auxiliary device driving mode cannot be executed is provided, and thus, the user can recognize whether or not the auxiliary device driving mode is permitted.

The prescribed auxiliary device may include at least one of an air conditioner, an audio device, a video device, a navigation system, a seat heater, and a mirror heater. The vehicle-mountable control device may further include an execution unit configured to execute the auxiliary device driving mode, when execution of the auxiliary device driving mode is requested and the auxiliary device driving mode is permitted.

An auxiliary device with small power consumption exerts a little influence on the charging speed even if the auxiliary device is driven during charging. Therefore, such auxiliary device would not excessively impede the convenience of a user of another vehicle (not cause a breach of manners) even if the auxiliary device is brought into the drivable state during charging regardless of execution/non-execution of the auxiliary device driving mode. An auxiliary device with relatively large power consumption is suitable as the auxiliary device (i.e., the above-described prescribed auxiliary device) brought into the drivable state as a result of execution of the auxiliary device driving mode. Examples of such auxiliary device include the air conditioner, the audio device, the video device, the navigation system, the seat heater, and the mirror heater described above. In some embodiments, because of large power consumption, the above-described auxiliary device is brought into the drivable state in response to a request from the user.

A charging system according to a first aspect of the present disclosure includes any vehicle-mountable control device described above, and a corresponding facility being the power feeding facility corresponding to the auxiliary device driving mode. The vehicle-mountable control device is configured to transmit a prescribed signal to the power feeding facility when a prescribed transmission condition is satisfied. The corresponding facility includes a second notification device configured to provide prescribed information. The corresponding facility is configured to cause the second notification device to provide a notification that the auxiliary device driving mode is permitted, when receiving the prescribed signal from the vehicle-mountable control device.

In the above-described charging system, the notification that the auxiliary device driving mode is permitted is provided, and thus, a user of another vehicle can recognize that quick charging is not in execution in the power feeding facility. When the user of the other vehicle wants to perform quick charging using the power feeding facility, the user of the other vehicle can inform the driver of the vehicle to that effect and request the driver of the vehicle to move the vehicle. Therefore, even if the auxiliary device driving mode is executed and the auxiliary device is driven during charging using the power feeding facility, the convenience of the user of the other vehicle would not be excessively impeded.

The transmission condition may include a condition that an SOC of a battery mounted on the vehicle becomes not less than a prescribed SOC value during charging of the battery with electric power supplied from the power feeding facility to the charging port for DC power. The corresponding facility may be configured to change a magnitude of the electric power supplied to the charging port for DC power. Furthermore, the corresponding facility may be configured to reduce the electric power supplied to the charging port for DC power, when receiving the prescribed signal from the vehicle-mountable control device.

In the above-described charging system, the electric power supplied from the power feeding facility to the vehicle decreases when the vehicle-mounted battery is fully charged. As a result, overcharging of the vehicle-mounted battery is suppressed.

A charging system according to a second aspect of the present disclosure includes any vehicle-mountable control device described above, and a corresponding facility being the power feeding facility corresponding to the auxiliary device driving mode. The corresponding facility includes an AC power supply configured to be supplied with electric power from a power grid, and a power conversion circuit configured to convert AC power output from the AC power supply to DC power and output the DC power.

By using the system power supply, a power feeding facility for the DC method (DC power supply method) with small electric power supply can be implemented at low cost. Although it is difficult to perform quick charging using such a power feeding facility, it is possible to feed electric power to a vehicle including a charging port for DC power. Particularly, in the case of a vehicle not including a charging port for AC power, the above-described power feeding facility has great significance. In such a power feeding facility with small electric power supply, execution of the auxiliary device driving mode during charging would be permitted (not cause a breach of manners), similarly to a normal charger.

The foregoing and other objects, features, aspects and advantages of the present disclosure will become more apparent from the following detailed description of the present disclosure when taken in conjunction with the accompanying drawings.

DETAILED DESCRIPTION

Figure 1:
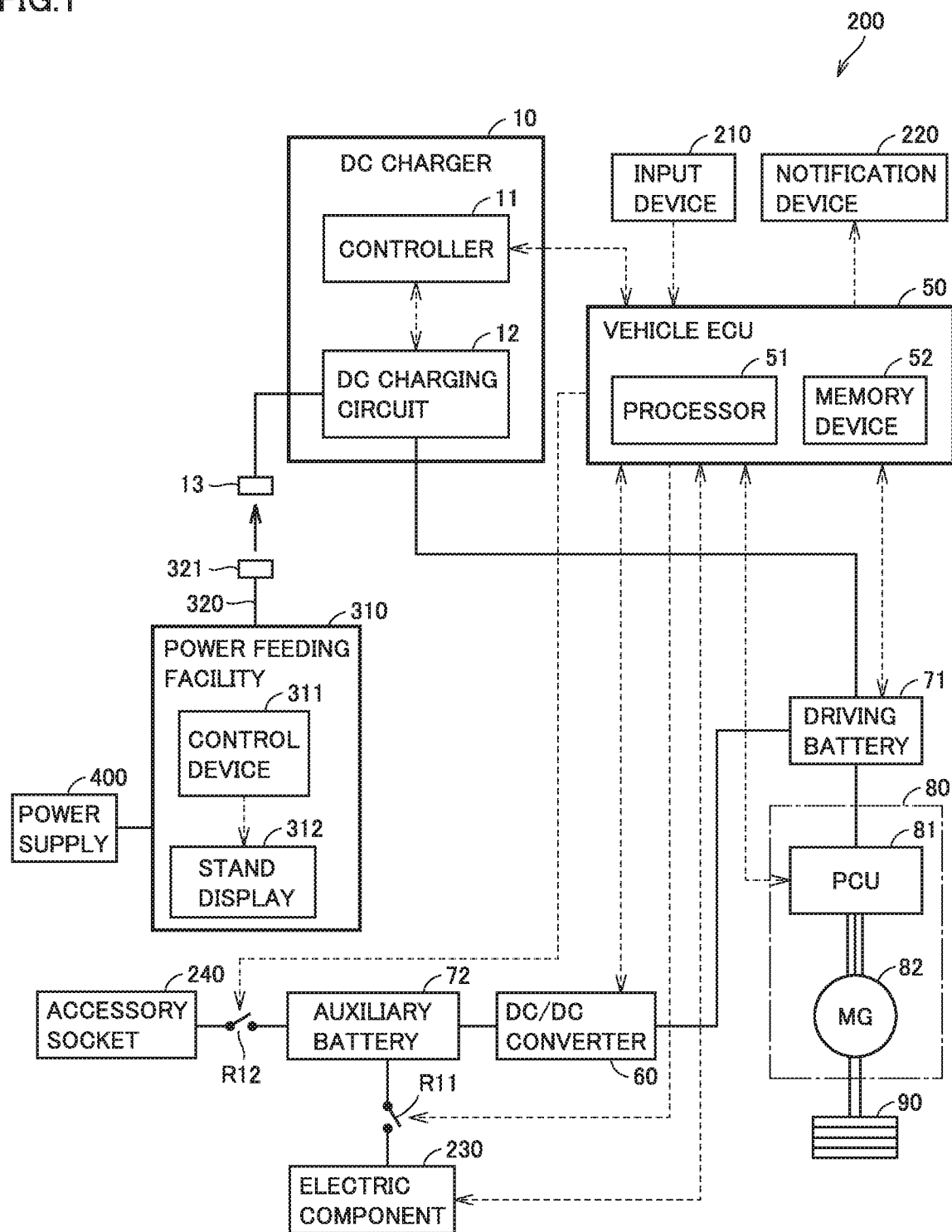
FIG. 1 shows a schematic configuration of a vehicle to which a vehicle-mountable control device according to a first embodiment of the present disclosure is applied.

Embodiments of the present disclosure will be described in detail with reference to the drawings, in which the same or corresponding portions are denoted by the same reference characters and description thereof will not be repeated.

Description will be given below of an example in which a vehicle to which a vehicle-mountable control device is applied is a hybrid vehicle (more particularly, a plug-in hybrid vehicle). However, the applicable range of the vehicle-mountable control device is not limited to the hybrid vehicle and the vehicle-mountable control device may be applied to an electric vehicle not having an engine mounted thereon. Hereinafter, an electronic control unit will be referred to as "ECU".

First Embodiment

FIG. 1 shows a schematic configuration of a vehicle to which a vehicle-mountable control device according to a first embodiment is applied. Referring to FIG. 1, a vehicle 200 includes a DC charger 10, a DC inlet 13, a vehicle ECU 50, a DC/DC converter 60, a driving battery 71, an auxiliary battery 72, a travel driving device 80, a driving wheel 90, an input device 210, a notification device 220, an electric component 230, and an accessory socket 240. Travel driving device 80 includes a PCU (Power Control Unit) 81 and an MG (Motor Generator) 82, and is configured to cause vehicle 200 to travel using electric power stored in driving battery 71. DC charger 10 and travel driving device 80 are controlled by vehicle ECU 50. Vehicle ECU 50, DC inlet 13 and electric component 230 according to the present embodiment form one example of "vehicle-mountable control device", "charging port for DC power" and "prescribed auxiliary device" according to the present disclosure, respectively.

Vehicle ECU 50 includes a not-shown input/output port and a not-shown communication port, in addition to a processor 51 and a memory device 52. A CPU (Central Processing Unit) can, for example, be used as processor 51. Memory device 52 includes a RAM (Random Access Memory) configured to temporarily store data, and a storage (e.g., a ROM (Read Only Memory) and a rewritable non-volatile memory) configured to save various types of information. In addition to programs used in various types of control, various parameters (e.g., a permission flag described below) used in the programs are also prestored in the storage. Processor 51 executes the programs stored in memory device 52 and the various types of control are thereby executed. Vehicle ECU 50 according to the present embodiment includes "determination unit", "information obtainment unit", "notification unit", and "execution unit" according to the present disclosure. "Determination unit", "information obtainment unit", "notification unit", and "execution unit" are implemented by, for example, processor 51 and the programs executed by processor 51. The various types of control can be processed not only by software but also by dedicated hardware (electronic circuit).

Input device 210 is a device configured to accept an input from the user. Input device 210 is operated by the user and outputs a signal corresponding to the operation by the user to vehicle ECU 50. A communication method may be wired or wireless. In addition to various switches (e.g., a push button switch), a keyboard, a mouse, a touch panel or the like can be used as input device 210. In the present embodiment, input device 210 includes a power switch PS described below, and operation devices S1 and S2 (see FIG. 2).

Notification device 220 is configured to perform a prescribed notification process for notifying the user (e.g., the driver of vehicle 200) in response to a request from vehicle ECU 50. Any notification process may be performed as the notification process for notifying the user. The user may be notified by display (e.g., a character or an image) on a display device, or may be notified by sound (including voice) with a speaker, or may be notified by causing a prescribed lamp to light up (including flashing). Examples of notification device 220 include a display device, a speaker and a lamp. In the present embodiment, notification device 220 includes a meter panel D1 and a head up display D2 described below (see FIG. 2) as well as an emergency flashing light.

Electric component 230 is a vehicle-mounted electronic device that can be driven when a relay R11 is turned on. Relay R11 is provided between electric component 230 and auxiliary battery 72. When relay R11 is turned on (brought into a connected state), electric power is supplied from auxiliary battery 72 to electric component 230. On the other hand, when relay R11 is turned off (brought into a disconnected state), the electric power is no longer supplied from auxiliary battery 72 to electric component 230. Electric component 230 is, for example, configured to operate in accordance with operation by the user. Electric component 230 is provided with an operation device, and the user can operate the operation device to power on and off electric component 230 or cause electric component 230 to perform a prescribed process or change an operation condition of electric component 230. In the present embodiment, electric component 230 includes a navigation system and an air conditioner described below.

Accessory socket 240 is an electric power supply device of a socket type configured to supply DC power having a prescribed voltage (e.g., about 12 V). Accessory socket 240 is provided, for example, in a console box in a vehicle cabin. Accessory socket 240 is supplied with electric power from auxiliary battery 72 and thereby becomes usable. A relay R12 is provided between accessory socket 240 and auxiliary battery 72. When relay R12 is turned on (brought into a connected state), electric power is supplied from auxiliary battery 72 to accessory socket 240. On the other hand, when relay R12 is turned off (brought into a disconnected state), the electric power is no longer supplied from auxiliary battery 72 to accessory socket 240.

When vehicle ECU 50 is in a stop state (including a sleep state), relays R11 and R12 described above are switched between the on state and the off state in accordance with operation of power switch PS described below. On the other hand, when vehicle ECU 50 is in an operating state, relays R11 and R12 described above are controlled to be turned on and off by vehicle ECU 50.

Driving battery 71 is a driving battery configured to store electric power for electrically powered traveling, and is charging-controlled by vehicle ECU 50. Although not shown, vehicle 200 further includes an engine (internal combustion engine). Vehicle 200 is a hybrid vehicle that can travel using both the electric power stored in driving battery 71 and an output of the engine (not shown). The kinetic energy generated by the engine is split by a power split device (not shown), and is used for driving of driving wheel 90 and used for power generation in a not-shown MG.

Driving battery 71 includes a secondary battery such as a lithium ion battery or a nickel-metal hydride battery, a charging relay controlled to be turned on and off by vehicle ECU 50, an SMR (system main relay) controlled to be turned on and off by vehicle ECU 50, and a monitoring device configured to monitor a state of driving battery 71 (all are not shown). The monitoring device includes various sensors configured to detect the state (e.g., a temperature, a current and a voltage) of driving battery 71, and outputs a result of detection to vehicle ECU 50. The charging relay is turned on when driving battery 71 is charged by a power feeding facility external to the vehicle (i.e., a facility including an external power supply). The SMR is arranged in an electric power supply path extending from driving battery 71 to travel driving device and is turned on when the vehicle travels using the electric power of driving battery 71. Vehicle ECU 50 obtains the state (e.g., the SOC) of driving battery 71 based on the output from the monitoring device (detection values of various sensors).

Driving battery 71 supplies electric power for driving wheel 90 by MG to PCU 81. MG 82 is a rotating electric machine and is, for example, a three-phase AC motor generator. MG 82 is driven by PCU 81 and rotates driving wheel 90. MG 82 can also perform regenerative power generation during braking of vehicle 200.

PCU 81 includes a controller including a processor (e.g., a CPU), an inverter and a converter (all are not shown). The controller of PCU 81 is configured to receive an instruction (control signal) from vehicle ECU 50 and control the inverter and the converter of PCU 81 in accordance with the instruction. During power running driving of MG 82, PCU 81 converts the electric power stored in driving battery 71 to AC power and supplies the AC power to MG 82. During power generation by MG 82, PCU 81 rectifies the generated electric power and supplies the rectified electric power to driving battery 71.

Auxiliary battery 72 is a vehicle-mounted battery configured to store electric power for driving an auxiliary device. Auxiliary battery 72 is a vehicle-mounted battery of a low voltage system (e.g., 12 V system) and supplies electric power to the auxiliary device mounted on vehicle 200. A lead battery can, for example, be used as auxiliary battery 72. However, a secondary battery (e.g., a nickel-metal hydride battery) other than the lead battery may be used as auxiliary battery 72.

The auxiliary device is a load that consumes electric power in vehicle 200 for purposes other than electrically powered traveling. In the present embodiment, notification device 220, electric component 230, accessory socket 240, and a computer for control (e.g., vehicle ECU 50) correspond to the auxiliary device. The auxiliary device mounted on vehicle 200 is driven by driving power (e.g., electric power having a voltage of approximately 5 V to 12 V) generated using electric power of auxiliary battery 72.

DC inlet 13 is a portion to which a charging cable is connected. The power feeding facility external to the vehicle (hereinafter, simply referred to as "power feeding facility") is connected to DC inlet 13 through the charging cable. DC inlet 13 is a charging port (DC charging port) corresponding to the DC method (direct current method). DC power supplied from the power feeding facility for the DC method to DC inlet 13 is input to DC charger 10. DC charger 10 is a vehicle-mounted charger corresponding to the DC method, and includes a controller 11 and a DC charging circuit 12. Controller 11 basically has the same hardware configuration as that of above-described vehicle ECU 50. That is, controller 11 also includes a processor and a memory device (both are not shown). DC charging circuit 12 includes, for example, a filter circuit, and various sensors configured to detect a state (e.g., a temperature, a current and a voltage) of each portion (all are not shown). A result of detection by the sensors indicating the state of each portion in DC charging circuit 12 is output to controller 11, and then, is transmitted from controller 11 to vehicle ECU 50.

When the power feeding facility is connected to DC inlet 13 through the charging cable, DC inlet 13 can receive the DC power supplied from the power feeding facility through the charging cable. When a prescribed charging start condition is satisfied in such a state, vehicle ECU 50 charges the vehicle-mounted battery (e.g., driving battery 71) with the electric power supplied from the power feeding facility to DC inlet 13. More specifically, the DC power supplied from the power feeding facility to DC inlet 13 through the charging cable is input to DC charging circuit 12. Controller 11 is configured to receive an instruction (control signal) from vehicle ECU and control DC charging circuit 12 in accordance with the instruction. For example, during charging of driving battery 71, the electric power of the power feeding facility is supplied to driving battery 71 through DC charging circuit 12. Details of the power feeding facility will be described below.

DC/DC converter 60 is configured to block or transform DC power supplied from driving battery 71 to auxiliary battery 72. For example, when auxiliary battery 72 is charged with the DC power supplied from driving battery 71. DC/DC converter 60 is controlled to transform (e.g., step down) the DC power supplied from driving battery 71 and output electric power having a prescribed voltage (e.g., about 12 V) to auxiliary battery 72. DC/DC converter 60 is controlled by vehicle ECU 50. When the electric power of driving battery 71 is supplied to auxiliary battery 72, an electric power supply path extending from driving battery 71 to auxiliary battery 72 is connected, and the electric power output from driving battery 71 is converted to prescribed electric power by DC/DC converter 60 and the converted electric power is supplied to auxiliary battery 72. When vehicle ECU 50 is in the stop state, the electric power supply path extending from driving battery 71 to auxiliary battery 72 is blocked by DC/DC converter 60 and the electric power of driving battery 71 is not supplied to auxiliary battery 72.

Figure 2:
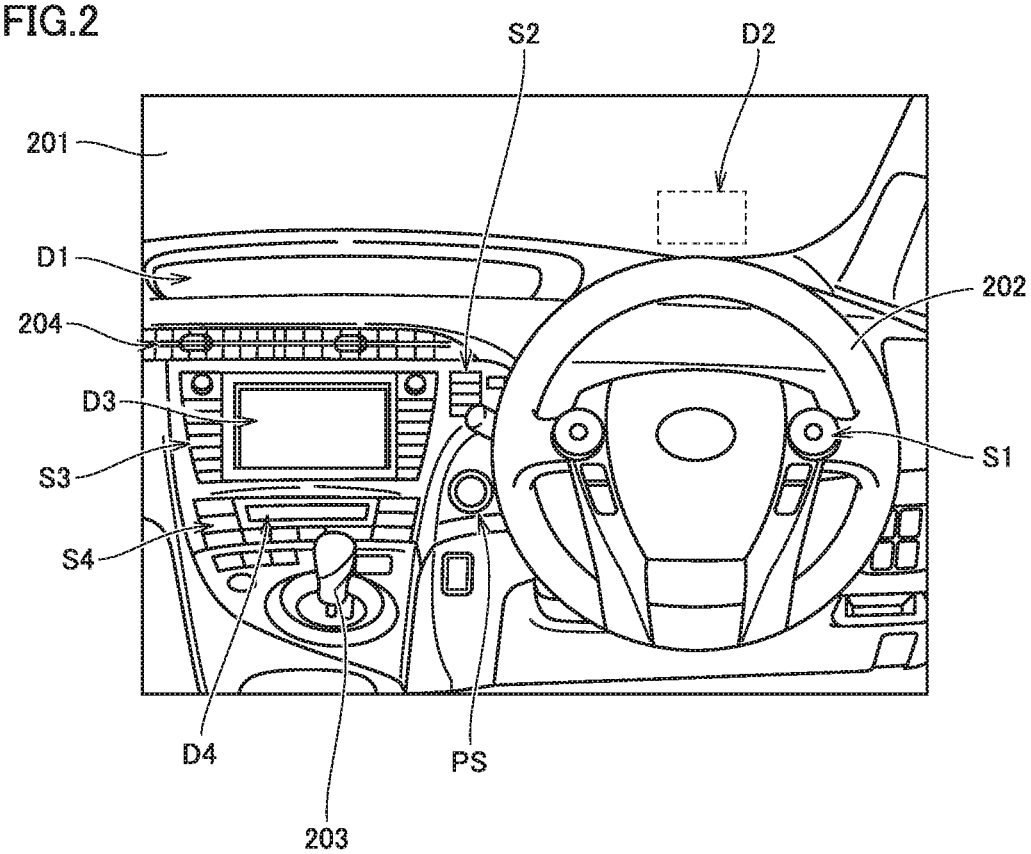
FIG. 2 shows a vehicle cabin (particularly, the vicinity of a driver's seat) of the vehicle according to the first embodiment of the present disclosure.

FIG. 2 shows the vehicle cabin (particularly, the vicinity of a driver's seat) of vehicle 200 according to the first embodiment.

Referring to FIG. 2 together with FIG. 1, vehicle 200 includes a windshield 201, a steering wheel 202 and a shift lever 203. Vehicle 200 further includes power switch PS and operation devices S1 and S2 included in input device 210. Vehicle 200 further includes meter panel D1 and head up display D2 included in notification device 220. Vehicle 200 further includes the navigation system and the air conditioner included in electric component 230. The navigation system includes an operation device S3 and a display device D3. The air conditioner includes an operation device S4, a display device D4 and an air outlet 204. A main body (e.g., a controller including a processor, and a GPS (Global Positioning System) module) of the navigation system is arranged in, for example, an instrument panel. A main body (e.g., an actuator such as an electrically powered compressor) of the air conditioner is arranged in, for example, an engine room or a motor room.

Although not shown, vehicle 200 is provided with various sensors (e.g., a vehicle speed sensor, a fuel gauge, an odometer, an accelerator opening degree sensor, an atmospheric pressure sensor, and an outdoor air temperature sensor) configured to detect a state of vehicle 200 and output the state of vehicle 200 to vehicle ECU 50. Vehicle ECU 50 is configured to determine a state (e.g., a travel speed of the vehicle, an outdoor air temperature, a remaining amount of fuel of the engine, an SOC of driving battery 71, a travel distance, a fuel consumption, and an electric mileage) of vehicle 200 based on values output from these sensors and a value output from the monitoring device of driving battery 71 described above. Meter panel D1 is located in the vicinity of windshield 201 and prescribed information (e.g., the state of vehicle 200 determined by vehicle ECU 50) is displayed on meter panel D1. Operation device S1 is an operation device of meter panel D1 and is provided on steering wheel 202. By operating operation device S1, the user can switch display of meter panel D1. In addition, head up display D2 is provided on windshield 201. A main body of head up display D2 is arranged in the instrument panel. The prescribed information (e.g., the state of vehicle 200 determined by vehicle ECU 50) is also displayed on head up display D2. Operation device S2 is an operation device of head up display D2 and is provided in the vicinity of steering wheel 202. By operating operation device S2, the user can switch on/off the display of head up display D2.

The navigation system further includes a processor, a memory device and a GPS module (all are not shown), in addition to operation device S3 and display device D3. The navigation system is configured to perform route search for finding an optimum route (e.g., a shortest route) from a current position of vehicle 200 to a destination, and display the optimum route found by the route search on a map. The map and the search result are displayed on display device D3. The navigation system may have a speaker function and be configured to provide a notification by sound (including voice). A control program and a map database are, for example, stored in the memory device. By operating operation device S3 (e.g., an operation button), the user can input the destination in the above-described route search to the navigation system. Vehicle ECU 50 and the navigation system are connected to communicate with each other. Vehicle ECU 50 can obtain information from the navigation system.

The air conditioner is a device configured to perform air conditioning (e.g., adjustment of at least one of an air temperature, an air humidity, air cleanliness, and an air flow) in the vehicle cabin. The air conditioner operates to blow the air-conditioned air from air outlet 204 into the vehicle cabin to thereby bring the air environment in the vehicle cabin closer to a prescribed target state. By operating operation device S4 (e.g., an operation button), the user can set a target state (e.g., a target temperature) for the air conditioner. The current air environment (e.g., a temperature) in the vehicle cabin and an operation condition of the air conditioner are displayed on display device D4. By operating operation device S4, the user can also change the operation condition (e.g., an orientation of air and an amount of air) of the air conditioner.

Power switch PS is provided in the vicinity of steering wheel 202. Power switch PS is operated, for example, when driving of vehicle 200 is started or ended. For example, when power switch PS is pressed, with a brake pedal (not shown) being depressed, in the case where the vehicle system is in a stop state, the vehicle system (and further, vehicle ECU 50) starts up. Then, the SMR of driving battery 71 is turned on by started vehicle ECU 50, and thus, electric power is supplied to travel driving device 80 and the vehicle is ready to travel. In addition, when the vehicle system is in an operating state, the driver of the vehicle can stop the vehicle system (and further, vehicle ECU 50) by stopping the vehicle, putting on a parking brake (not shown) and bringing the shift position into P (parking) with shift lever 203, and then, pressing power switch PS. Vehicle ECU 50 enters, for example, the sleep state.

When the vehicle system is in the stop state, each of relays R11 and R12 is off, and thus, electric power is not supplied to the auxiliary device other than the emergency flashing light included in notification device 220. Hereinafter, such a state of the auxiliary device will be referred to as "power off". When power switch PS is pressed, with the brake pedal being not depressed, in the case where the auxiliary device is in "power off", relay R12 is turned on and electric power is also supplied to accessory socket 240 in addition to the above-described emergency flashing light. Hereinafter, this state will be referred to as "accessory on". Furthermore, when power switch PS is pressed, with the brake pedal being not depressed, in the case where the auxiliary device is in "accessory on", relay R11 is turned on and electric power is also supplied to electric component 230 in addition to the above-described emergency flashing light and accessory socket 240. Hereinafter, this state will be referred to as "power on". When power switch PS is pressed, with the brake pedal being not depressed, in the case where the auxiliary device is in "power on", each of relays RI 1 and R12 is turned off and the auxiliary device enters "power off". The auxiliary device supplied with electric power in "power off" and in "accessory on" can be arbitrarily set and is not limited to the foregoing.

When the time that elapses from when the auxiliary device enters "accessory on" or "power on" exceeds a prescribed time (e.g., one hour), the auxiliary device automatically enters "power off". For example, when the auxiliary device enters "accessory on" or "power on", a not-shown timer starts a countdown to the prescribed time. When the remaining time reaches zero, relays R11 and R12 are both turned off in accordance with a signal from the timer and the auxiliary device enters "power off". As a result of such control for turning off relays R11 and R12, a power shortage in the auxiliary battery (and further, auxiliary battery depletion) is suppressed.

When the charging cable is connected to DC inlet 13 in the case where the vehicle system is in the stop state, vehicle ECU 50 starts up and relays R11 and R12 are controlled by started vehicle ECU 50. Although not shown, DC inlet 13 is provided with a detector (hereinafter, also referred to as "connection detector") configured to detect that a connector of the charging cable is locked (and further, the charging cable is connected to DC inlet 13). Examples of the connection detector include a limit switch, a proximity sensor and a photoelectric sensor. When the connector of the charging cable is locked, a signal (hereinafter, also referred to as "cable connection signal") indicating that the connector of the charging cable is locked is output from the connection detector to vehicle ECU 50 in the stop state. When the cable connection signal is input to vehicle ECU 50, vehicle ECU 50 starts up. The startup of vehicle ECU 50 brings notification device 220 into a drivable state.

When the charging cable is connected to DC inlet 13, power on of the auxiliary device is prohibited as a general rule. When the charging cable is connected to DC inlet 13, vehicle ECU 50 does not turn on relays R11 and R12 unless the user executes the DC my room mode. That is, when the charging cable is connected to DC inlet 13, the auxiliary device does not enter the power on state unless the DC my room mode is executed. The DC my room mode is a control mode of bringing electric component into a drivable state when the power feeding facility is connected to DC inlet 13 through the charging cable. The DC my room mode according to the present embodiment corresponds to one example of "auxiliary device driving mode" according to the present disclosure.

When the DC my room mode is in execution, the electric power of the power feeding facility is supplied to auxiliary battery 72 (and further, electric component 230) directly or indirectly. In the present embodiment, the electric power of the power feeding facility is supplied to electric component 230 through driving battery 71, DC/DC converter 60 and auxiliary battery 72. Driving battery 71 and auxiliary battery 72 may function as a buffer. When the DC my room mode is in execution, the electric power supply path extending from driving battery 71 to auxiliary battery 72 is connected by DC/DC converter 60 and relays R11 and R12 are turned on. Then, the electric power of the power feeding facility is supplied to driving battery 71 through DC charging circuit 12. Furthermore, the electric power output from driving battery 71 is converted to prescribed electric power by DC/DC converter 60 and the converted electric power is supplied to auxiliary battery 72. Furthermore, the electric power output from auxiliary battery 72 is supplied to electric component 230 through relay R11. When the DC my room mode is in execution, the electric power is supplied from the power feeding facility to auxiliary battery 72, and thus, a power shortage of auxiliary battery 72 (and further, auxiliary battery depletion) is suppressed.

A quick charger is used for the purpose of charging a vehicle-mounted battery in a short time (i.e., quick charging), and thus, it is undesirable to drive an auxiliary device during charging of the vehicle-mounted battery by the quick charger and prolong the charging time. When the DC my room mode is executed and the auxiliary device is driven during quick charging by the quick charger, the convenience of a user of another vehicle may be impeded.

However, if the power feeding facility for the DC method is configured to correspond to the DC my room mode, the convenience of the user (e.g., the driver and the passenger) of the vehicle can be improved (i.e., the DC my room mode can be permitted) without excessively impeding the convenience of a user of another vehicle. The vehicle-mountable control device (vehicle ECU 50) according to the present embodiment is configured to permit the DC my room mode when the power feeding facility corresponds to the DC my room mode, and not permit the DC my room mode when the power feeding facility does not correspond to the DC my room mode. Thus, the convenience of the user of the vehicle can be improved without excessively impeding the convenience of a user of another vehicle.

A charging system according to the present embodiment includes above-described vehicle 200 (i.e., the vehicle including vehicle ECU 50), one example of a power feeding facility not corresponding to the DC my room mode (hereinafter, also referred to as "non-corresponding facility"), and first and second examples of a power feeding facility corresponding to the DC my room mode (hereinafter, also referred to as "first corresponding facility" and "second corresponding facility"). The non-corresponding facility and the first and second corresponding facilities will be described below.

All of the non-corresponding facility and the first and second corresponding facilities are power feeding facilities for the DC method. Each of the non-corresponding facility and the first corresponding facility is a public facility, and the second corresponding facility is a non-public facility. The public facility is a facility open to the public and is placed in, for example, a public building (e.g., a government office, a hospital or a library), a commercial building, an accommodation building, and a parking lot (e.g., a highway rest area). The non-public facility is a facility not open to the public and is placed in, for example, a personal area (e.g., a house). First, components common to the non-corresponding facility and the first and second corresponding facilities will be described with reference to FIG. 1.

Referring to FIG. 1, the power feeding facility includes a main body 310, a charging cable 320 and a power supply 400. Charging cable 320 is connected to main body 310. However, charging cable 320 is detachable from main body 310. Main body 310 is supplied with electric power from power supply 400 and outputs the electric power to charging cable 320. Main body 310 has a control device 311 and a display (hereinafter, referred to as "stand display") 312 built therein. Control device basically has the same hardware configuration as that of above-described vehicle ECU 50. That is, control device 311 also includes a processor and a memory device (both are not shown). In the present embodiment, a touch panel display is used as stand display 312. Stand display 312 is configured to display information requested from control device 311, and output a signal corresponding to a prescribed operation to control device 311 when the user performs the prescribed operation on the displayed screen. Charging cable 320 has a connector 321 at a tip thereof and includes a signal line and a power line therein. When the power feeding facility is connected to DC inlet 13 through charging cable 320, control device 311 and vehicle ECU 50 are connected to communicate with each other and an electric power supply path extending from power supply 400 to DC charging circuit 12 is formed.

Next, the non-corresponding facility and the first corresponding facility will be described in this order.

In the non-corresponding facility, power supply 400 is a three-phase AC power supply having a voltage of 200 V. Main body 310 of the non-corresponding facility further includes a power conversion circuit (not shown) including an AC/DC converter and a boosting circuit, in addition to the components shown in FIG. 1. The power conversion circuit performs prescribed power conversion of AC power supplied from power supply 400 and outputs DC power of about 50 kW (rated voltage: 400 V, rated current: 125 A) to charging cable 320. Such a power feeding facility belongs to a so-called quick charger and is used for quick charging. Therefore, when the DC my room mode is executed and the auxiliary device is driven during quick charging by the non-corresponding facility, the convenience of a user of another vehicle may be impeded.

In the first corresponding facility, power supply 400 is a three-phase AC power supply having a voltage of 200 V. Main body 310 of the first corresponding facility further includes a power conversion circuit (not shown) including an AC/DC converter and a boosting circuit, in addition to the components shown in FIG. 1. The power conversion circuit performs prescribed power conversion of AC power supplied from power supply 400 and outputs DC power of about 4 kW (rated voltage: 400 V, rated current: 10 A) to charging cable 320. The power feeding facility having an output current value of less than 50 A has a charging speed close to that of a normal charger. Therefore, even when the DC my room mode is executed and the auxiliary device is driven during charging by the first corresponding facility, the possibility of excessively impeding the convenience of a user of another vehicle would be low. Thus, in the first corresponding facility, execution of the DC my room mode during charging would be permitted (not cause a breach of manners), similarly to the normal charger.

Figure 3:
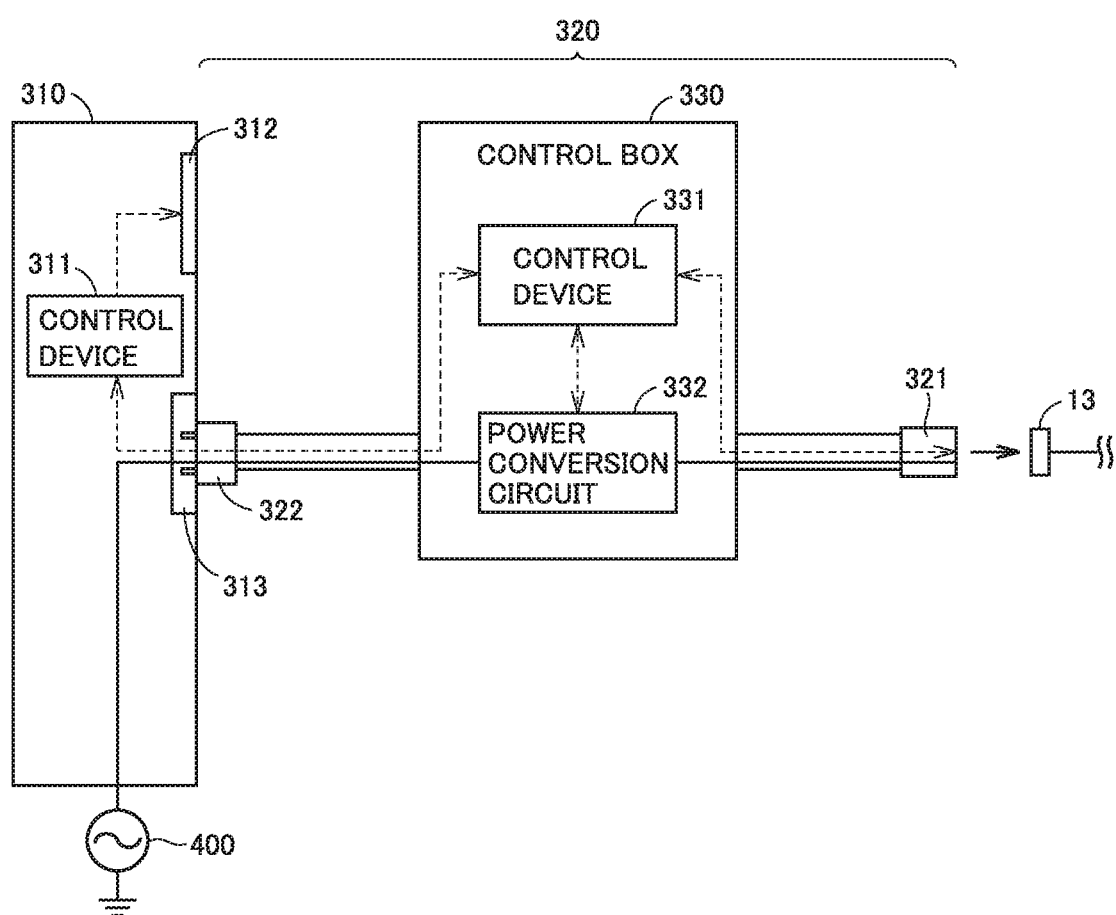
FIG. 3 illustrates a configuration of a second corresponding facility in a charging system according to the first embodiment of the present disclosure.

Next, the second corresponding facility will be described. FIG. 3 illustrates a configuration of the second corresponding facility. Referring to FIG. 3, in the second corresponding facility, power supply 400 is a household power supply (more particularly, a system power supply) having a voltage of 200 V. The system power supply is an AC power supply configured to be supplied with electric power from a power grid (e.g., a power grid provided by a power company). Main body 310 further includes an electric outlet 313, in addition to the components shown in FIG. 1. Charging cable 320 has a plug 322 at an end (base end) opposite to connector 321, and has a control box 330 in the middle of the cable (i.e., between connector 321 and plug 322). Control box 330 has a control device 331 and a power conversion circuit 332 including an AC/DC converter and a boosting circuit built therein. Control device basically has the same hardware configuration as that of above-described vehicle ECU 50. That is, control device 331 also includes a processor and a memory device (both are not shown). Power conversion circuit 332 is controlled by control device 331. In a state where the second corresponding facility is connected to DC inlet 13 through charging cable 320, control device 311, control device 331 and vehicle ECU 50 are connected to communicate with one another. Power conversion circuit 332 is controlled by control device 331, and blocks or performs AC/DC conversion of electric power supplied from electric outlet 313 to DC inlet 13. Control device 331 controls power conversion circuit 332 in accordance with an instruction from each of control device 311 and vehicle ECU 50.

In the second corresponding facility, when plug 322 is connected to electric outlet 313, control device 311 and control device 331 are connected to communicate with each other, and power supply 400 and power conversion circuit 332 are electrically connected to each other. As a result, electric power is supplied from power supply 400 to power conversion circuit 332. Power conversion circuit 332 is configured to convert AC power supplied from power supply 400 (in the present embodiment, a system power supply) to DC power and output the DC power. In the second corresponding facility, power conversion circuit 332 outputs the DC power of about 4 kW (rated voltage: 400 V, rated current: 10 A) to connector 321. An output current value (rated current) of the second corresponding facility is less than 50 A. Therefore, even when the DC my room mode is executed and the auxiliary device is driven during charging by the second corresponding facility, the possibility of excessively impeding the convenience of a user of another vehicle would be low. In addition, the second corresponding facility is a non-public facility and the number of users of the non-public facility is small. From this perspective as well, the possibility of impeding the convenience of a user of another vehicle when the DC my room mode is executed and the auxiliary device is driven during charging by the second corresponding facility would be low.

Figure 4:
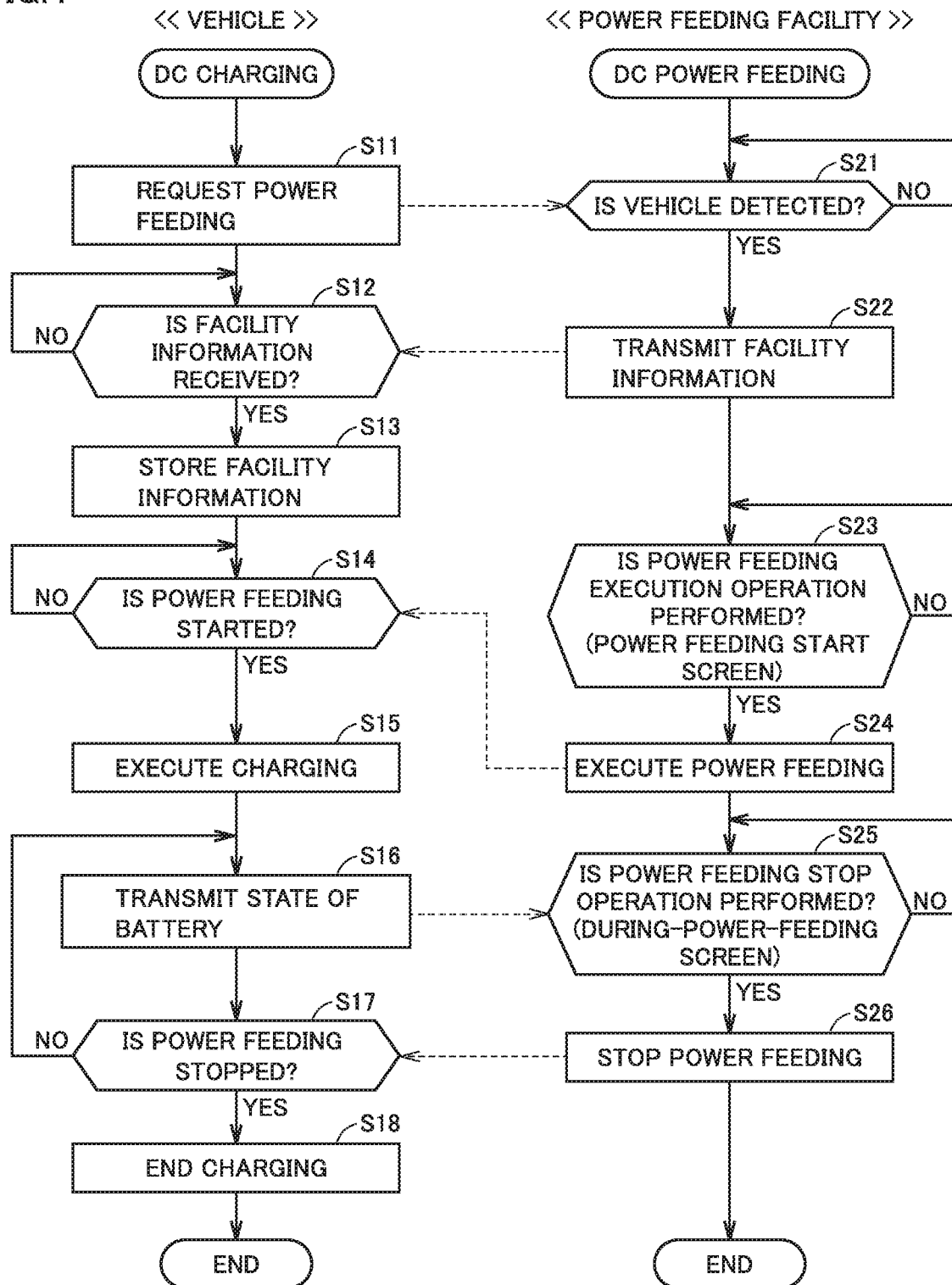
FIG. 4 is a flowchart showing a process procedure for each of control executed in the vehicle and control executed in a power feeding facility when a vehicle-mounted battery is charged with electric power supplied from the power feeding facility in the charging system according to the first embodiment of the present disclosure.

FIG. 4 is a flowchart showing a process procedure for each of control executed in vehicle 200 and control executed in the power feeding facility when the vehicle-mounted battery is charged with electric power supplied from the power feeding facility in the charging system according to the first embodiment. The process on the vehicle 200 side shown in FIG. 4 is started, for example, when the above-described connection detector detects that connector 321 of charging cable 320 is locked (and further, charging cable 320 is connected to DC inlet 13) and vehicle ECU 50 starts up in response to the above-described cable connection signal. On the other hand, the process on the power feeding facility side shown in FIG. 4 is started when the user performs a prescribed operation (hereinafter, also referred to as "start operation") on the power feeding facility. Communication between vehicle ECU 50 and the power feeding facility in the process in FIG. 4 is performed through, for example, charging cable 320 (more particularly, the signal line in the cable).

Referring to FIG. 4, in step (hereinafter, also simply denoted as "S") 11, vehicle ECU 50 transmits a signal for requesting power feeding (hereinafter, also referred to as "power feeding request signal") to the power feeding facility (hereinafter, referred to as "target facility") through charging cable 320. On the other hand, when the user performs the above-described start operation, control device 311 of the target facility determines in S21 whether or not the power feeding request signal is received from vehicle 200. Until the reception of the power feeding request signal is recognized (i.e., during a time period in which determination of NO is made in S21), the process in S21 is repeatedly performed at every prescribed control cycle.

When the above-described power feeding request signal is received (i.e., when determination of YES is made in S21), control device 311 of the target facility detects vehicle 200. When the above-described power feeding request signal is received (i.e., when vehicle 200 is detected), control device 311 transmits prescribed facility information about the target facility to vehicle 200 in S22. In the present embodiment, the above-described facility information includes a parameter (e.g., an output current value corresponding to a rated current) indicating a magnitude of electric power supplied by the target facility. For example, when the target facility is the non-corresponding facility, control device 311 of the target facility transmits, to vehicle 200, the facility information indicating that the output current value is 125 A. When the target facility is the first or second corresponding facility, control device 311 of the target facility transmits, to vehicle 200, the facility information indicating that the output current value is 10 A. An electric power value (unit: watt) may be used instead of the output current value.

On the other hand, in S12, vehicle ECU 50 determines whether or not the facility information is received from the target facility. Until the reception of the facility information is recognized (during a time period in which determination of NO is made in S12), the process in S12 is repeatedly performed at every prescribed control cycle. When the facility information transmitted from the target facility in S22 is obtained (YES in S12), vehicle ECU 50 stores the obtained facility information in memory device 52 in S13.

Figure 5:
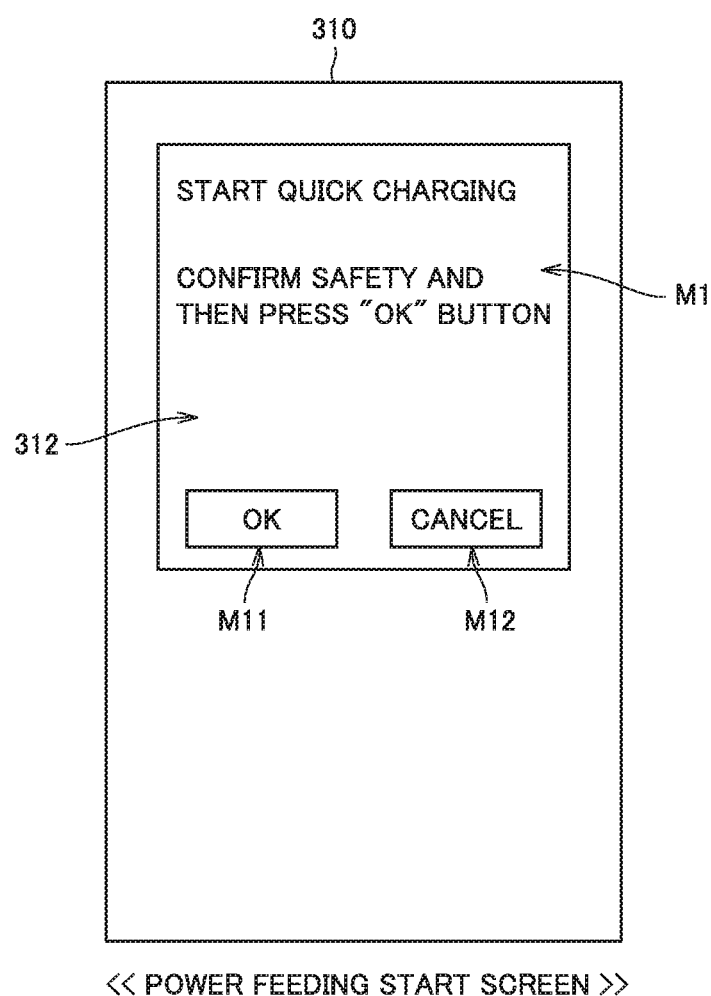
FIG. 5 shows one example of a power feeding start screen displayed on a stand display shown in FIG. 1.

After the process in S22 above, control device 311 of the target facility causes stand display 312 to display a power feeding start screen and awaits a power feeding execution operation from the user in S23. Until the power feeding execution operation is performed, it is repeatedly determined in S23 at every prescribed control cycle whether or not the power feeding execution operation is performed. FIG. 5 shows one example of the power feeding start screen displayed on stand display 312.

Referring to FIG. 5, a message M1, an OK button M11 and a cancel button M12 are displayed on the power feeding start screen, and the power feeding start screen urges the user to select OK button M11 or cancel button M12. On the power feeding start screen, selecting OK button M11 corresponds to the above-described power feeding execution operation. That is, when OK button M11 is selected by the user, determination of YES is made in S23. On the other hand, when cancel button M12 is selected by the user, power feeding is stopped and the process in FIG. 4 ends. Stand display 312 is a touch panel display, and thus, when a finger or a pen touches the screen, for example, stand display 312 can sense the touched screen position. By touching the screen (e.g., pressing the button on the screen), the user can select OK button M11 or cancel button M12.

Referring again to FIG. 4, when determination of YES is made in S23, control device 311 of the target facility transmits, to vehicle 200, a signal indicating the start of power feeding (hereinafter, also referred to as "power feeding start signal") and executes power feeding to vehicle 200 in S24. As a result, prescribed DC power is supplied to connector 321.

On the other hand, after the process in S13 above, vehicle ECU 50 determines in S14 whether or not the power feeding start signal is received from the target facility. Until the reception of the power feeding start signal is recognized (during a time period in which determination of NO is made in S14), the process in S14 is repeatedly performed at every prescribed control cycle. When the power feeding start signal transmitted from the target facility in S24 is received (YES in S14), vehicle ECU 50 turns on the charging relay (not shown) of driving battery 71 (brings the charging relay of driving battery 71 into a conducting state) and executes charging of driving battery 71 in S15. After the start of charging, vehicle ECU 50 transmits the state (e.g., the SOC) of driving battery 71 to the target facility in S16, and determines whether or not power feeding stops in S17. Until the stop of power feeding is recognized (during a time period in which determination of NO is made in S17), the processes in S16 and S17 are repeatedly performed at every prescribed control cycle.

Figure 6:
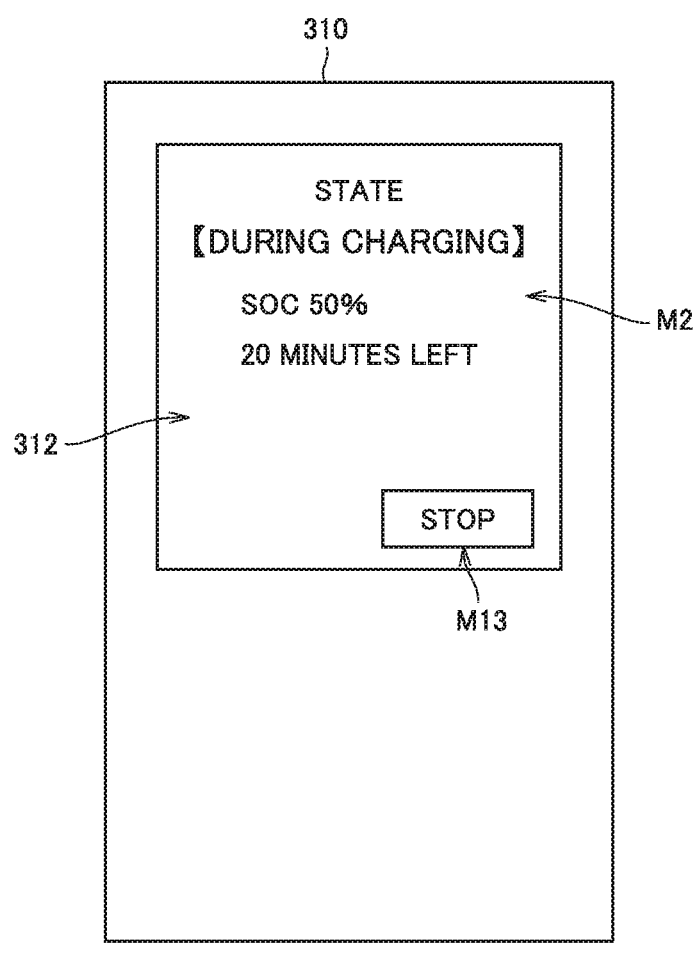
FIG. 6 shows one example of a during-power-feeding screen displayed on the stand display shown in FIG. 1.

After the start of power feeding, control device 311 of the target facility causes stand display 312 to display a during-power-feeding screen and awaits a power feeding stop operation from the user in S25. Until the power feeding stop operation is performed, it is repeatedly determined in S25 at every prescribed control cycle whether or not the power feeding stop operation is performed. FIG. 6 shows one example of the during-power-feeding screen displayed on stand display 312.

Referring to FIG. 6, a message M2 and a STOP button M13 are displayed on the during-power-feeding screen. Message M2 includes the SOC of driving battery 71 obtained from vehicle 200, and the charging time to full charge calculated from the SOC. The SOC indicates a remaining amount of power storage and is, for example, a ratio of a current amount of power storage to an amount of power storage in a fully charged state expressed in 0 to 100%.

By pressing STOP button M13, the user can stop power feeding to vehicle 200 (and further, charging of driving battery 71). The user can determine the timing of pressing STOP button M13 by referring to message M2. On the during-power-feeding screen, pressing STOP button M13 corresponds to the above-described power feeding stop operation. That is, when STOP button M13 is pressed by the user, determination of YES is made in S25.

Referring again to FIG. 4, when determination of YES is made in S25, control device 311 of the target facility transmits, to vehicle 200, a signal indicating the stop of power feeding (hereinafter, also referred to as "power feeding stop signal") and stops power feeding to vehicle 200 in S26. On the other hand, when the power feeding stop signal is received from the target facility, vehicle ECU 50 determines that power feeding stops (YES) in S17, and turns off the charging relay (not shown) of driving battery 71 (brings the charging relay of driving battery 71 into a non-conducting state) and ends charging of driving battery 71 in S18.

Figure 7:
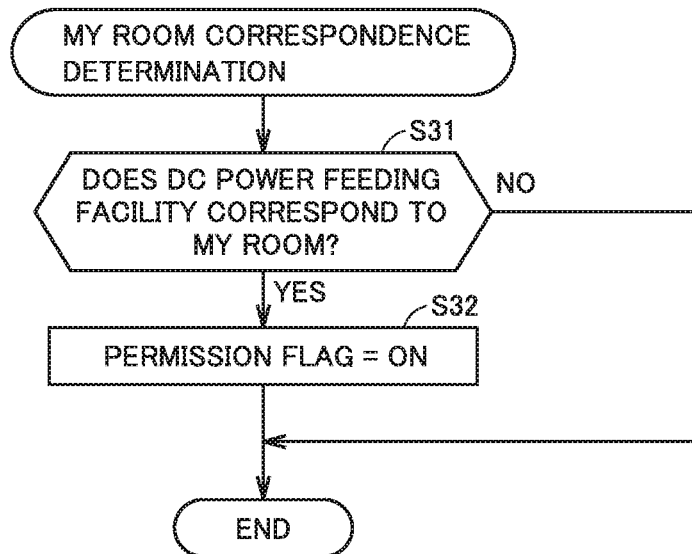
FIG. 7 is a flowchart showing a process procedure for my room correspondence determination, which is performed by the vehicle-mountable control device according to the first embodiment of the present disclosure.

FIG. 7 is a flowchart showing a process procedure for my room correspondence determination, which is performed by vehicle ECU 50 according to the first embodiment. The process shown in this flowchart is started, for example, when it is determined in S12 in FIG. 4 that the facility information is received (YES).

Referring to FIG. 7, in S31, vehicle ECU 50 determines whether or not the target facility corresponds to the DC my room mode based on the above-described facility information. For example, when the output current value of the target facility is not more than a prescribed value, vehicle ECU 50 determines that the target facility corresponds to the DC my room mode (YES in S31). When the output current value of the target facility exceeds the prescribed value, vehicle ECU 50 determines that the target facility does not correspond to the DC my room mode (NO in S31). The prescribed value used in S31 is, for example, less than 50 A, and may be selected from the range of not less than 1 A and not more than 25 A. In the present embodiment, the prescribed value used in S31 is 15 A. Therefore, determination of NO is made in S31 when the target facility is the non-corresponding facility (output current value: 125 A), and determination of YES is made in S31 when the target facility is the first or second corresponding facility (output current value: 10 A).

When it is determined in S31 that the target facility corresponds to the DC my room mode (YES), vehicle ECU 50 turns on a value (an initial value is off) of the permission flag stored in memory device 52 in S32. The permission flag is a parameter indicating whether or not the DC my room mode is permitted. The value of the permission flag being on means that the DC my room mode is permitted. The value of the permission flag being off means that the DC my room mode is not permitted. The value of the permission flag is turned on in S32, and thus, the DC my room mode is permitted.

On the other hand, when it is determined in S31 that the target facility does not correspond to the DC my room mode (NO), S32 is skipped and the process in FIG. 7 ends. That is, the value of the permission flag is not changed from off (initial value) and a state of prohibition of the DC my room mode (initial state) is maintained. The value of the permission flag is initialized when vehicle ECU 50 stops or when charging ends in S18 in FIG. 4.

Figure 8:
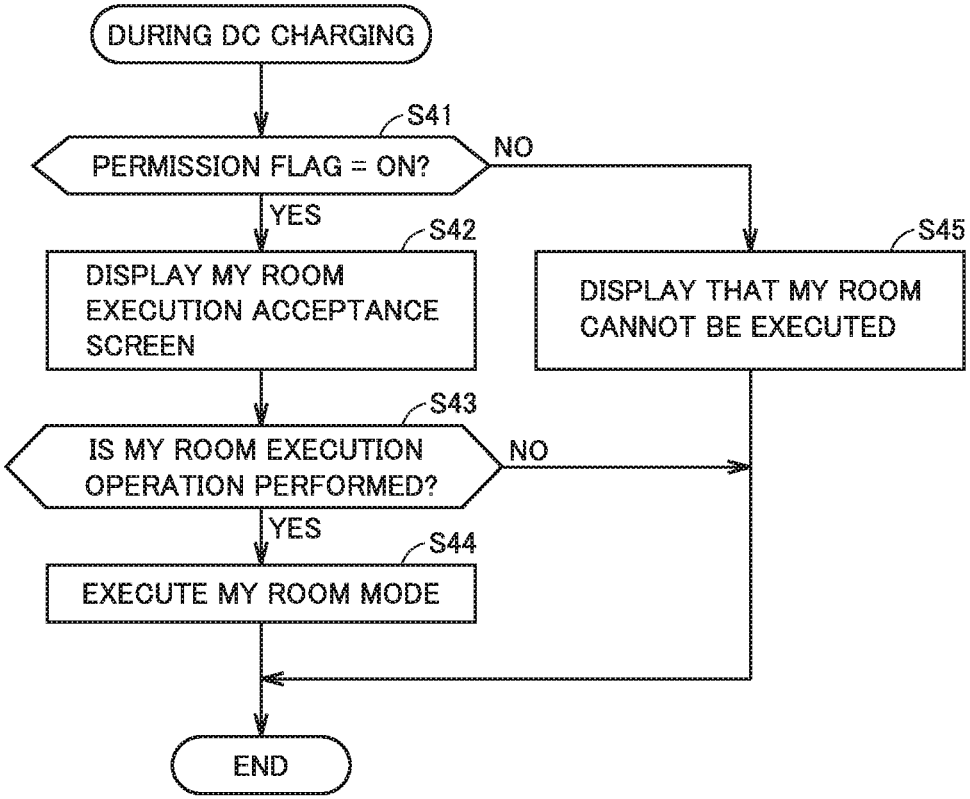
FIG. 8 is a flowchart showing a process procedure for DC my room mode execution/non-execution control, which is performed by the vehicle-mountable control device according to the first embodiment of the present disclosure.

FIG. 8 is a flowchart showing a process procedure for DC my room mode execution/non-execution control, which is performed by vehicle ECU 50 according to the first embodiment. The process shown in this flowchart is started, for example, when the DC my room mode is requested by the user during charging of driving battery (refer to S15 to S17 in FIG. 4). By operating power switch PS, for example, the user can request the DC my room mode to vehicle ECU 50.

Figure 9:
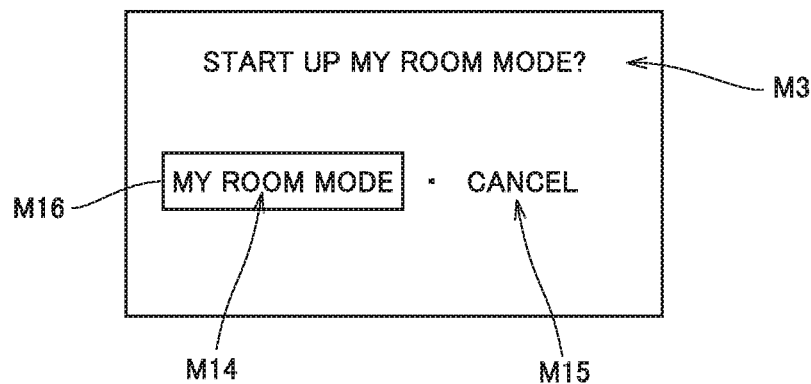
FIG. 9 shows one example of a my room execution acceptance screen displayed on a meter panel shown in FIG. 2.

Referring to FIG. 8, when vehicle ECU 50 receives the request of the DC my room mode from the user, vehicle ECU 50 checks the above-described value of the permission flag (see FIG. 7) in S41. When the value of the permission flag is on (YES in S41), vehicle ECU 50 causes notification device 220 (e.g., meter panel D1) to display a my room execution acceptance screen in S42, and determines whether or not a my room execution operation is performed within a prescribed time period in S43. By performing the my room execution operation on the my room execution acceptance screen, the user can request execution of the DC my room mode to vehicle ECU 50. FIG. 9 shows one example of the my room execution acceptance screen displayed on meter panel D1.

Referring to FIG. 9 together with FIG. 8, a message M3, a "my room mode" option M14, a "cancel" option M15, and a cursor M16 are displayed on the my room execution acceptance screen, and the my room execution acceptance screen urges the user to select option M14 or M15. By operating operation device S1 (FIG. 2), the user can select option M14 or M15. For example, operation device S1 includes a cursor key (arrow button) and an enter button. By using the cursor key to place cursor M16 over option M14 or M15 and pressing the enter button, the user can select option M14 or M15. On the my room execution acceptance screen, selecting option M14 corresponds to the above-described my room execution operation. That is, when option M14 is selected by the user, determination of YES is made in S43. On the other hand, when option M15 is selected by the user, determination of NO is made in S43. When a prescribed time period (e.g., 100 seconds) elapses without both option M14 and M15 being selected, since the my room execution acceptance screen has been displayed in S42, determination of NO is also made in S43. When determination of NO is made in S43, the process in FIG. 8 ends.

Referring again to FIG. 8, when determination of YES is made in S43, vehicle ECU 50 executes the DC my room mode in S44. When the DC my room mode is executed, the auxiliary device is powered on. That is, relays RI 1 and R12 are turned on by vehicle ECU 50 and electric component 230 (e.g., the air conditioner and the navigation system) enters the drivable state. Thereafter, when the power feeding stop operation is performed by the user (YES in S25 in FIG. 4), the DC my room mode ends.

When a request to stop the DC my room mode is made by the user during execution of the DC my room mode, vehicle ECU 50 ends the DC my room mode. By operating power switch PS, for example, the user can request vehicle ECU 50 to stop the DC my room mode. In addition, when any other end condition is satisfied (e.g., when an amount of power consumption in the vehicle is larger than an amount of charging of driving battery 71 and a shortage of a remaining amount of driving battery 71 occurs) during execution of the DC my room mode, vehicle ECU 50 also ends the DC my room mode.

Figure 10:
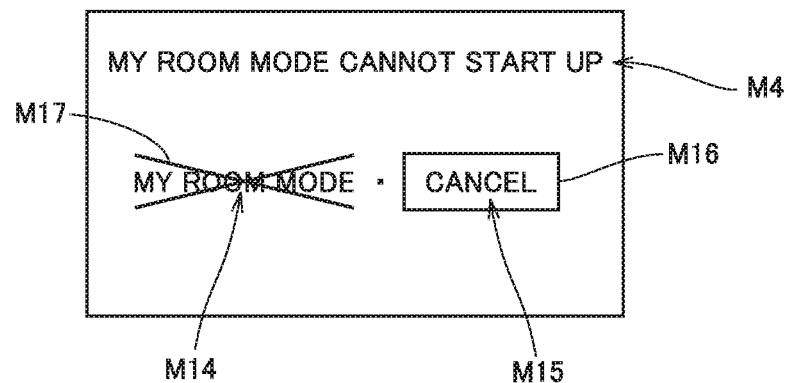
FIG. 10 shows one example of a screen displayed to provide a notification that the DC my room mode cannot be executed, in the charging system according to the first embodiment of the present disclosure.

When it is determined in S41 above that the value of the permission flag is off (NO), vehicle ECU 50 causes notification device 220 (e.g., meter panel D1) to provide a notification that the DC my room mode cannot be executed in S45. FIG. 10 shows one example of a screen displayed on meter panel D to provide the notification that the DC my room mode cannot be executed. Meter panel D1 according to the present embodiment corresponds to one example of "first notification device" according to the present disclosure.

Referring to FIG. 10 together with FIG. 8, a message M4 and a cross mark M17 are, for example, displayed on meter panel D1 to notify the user that the DC my room mode cannot be executed. On this screen, cursor M16 cannot be moved. This screen ends when the enter button included in operation device S1 is pressed. In addition, when a prescribed time period (e.g., 100 seconds) elapses without the enter button being pressed, since the screen has been displayed in S45, this screen also ends. When this screen ends, the process in FIG. 8 ends.

As described above, vehicle ECU 50 (vehicle-mountable control device) according to the present embodiment includes a determination unit and an information obtainment unit described below. The information obtainment unit is configured to obtain the prescribed facility information about the power feeding facility (S12 in FIG. 4). The determination unit is configured to permit the DC my room mode when it is determined that the power feeding facility corresponds to the DC my room mode based on the above-described facility information, and not permit the DC my room mode when it is determined that the power feeding facility does not correspond to the DC my room mode based on the above-described facility information (S31 and S32 in FIG. 7). As a result, the convenience of the user of the vehicle can be improved without excessively impeding the convenience of a user of another vehicle.

Vehicle ECU 50 further includes a notification unit (S45 in FIG. 8) configured to cause meter panel D to provide the notification that the DC my room mode cannot be executed, when it is determined that the DC my room mode is not permitted (NO in S41 in FIG. 8). As a result, the user can recognize whether or not the DC my room mode is permitted, and thus, the convenience of the user is improved. Any other notification device may be used instead of meter panel D1. For example, head up display D2 may be used instead of meter panel D1. Any method may be used as a method for notifying the user. The user may be notified by causing a display device to display a character or an image, or may be notified by sound (including voice) with a speaker, or may be notified by causing a prescribed lamp to light up (including flashing).

Vehicle ECU 50 further includes an execution unit (S44 in FIG. 8) configured to execute the DC my room mode, when execution of the DC my room mode is requested as a result of the my room execution operation (YES in S43 in FIG. 8) and the DC my room mode is permitted (YES in S41 in FIG. 8). When the DC my room mode is executed, electric component 230 including the navigation system and the air conditioner enters the drivable state. As a result, the convenience of the user of the vehicle can be improved without excessively impeding the convenience of a user of another vehicle.

Second Embodiment

A charging system according to a second embodiment of the present disclosure will be described. Since there are many common features between the first embodiment and the second embodiment, differences will be mainly described and description of the common features will not be repeated.

The charging system according to the second embodiment basically has a configuration equivalent to that of the charging system according to the first embodiment (see FIG. 1). However, in the charging system according to the second embodiment, a process in FIG. 12 below is performed instead of the processes in FIGS. 7 and 8. In addition, the charging system according to the second embodiment includes a power feeding facility described below (i.e., a third corresponding facility corresponding to the DC my room mode).

Figure 11:
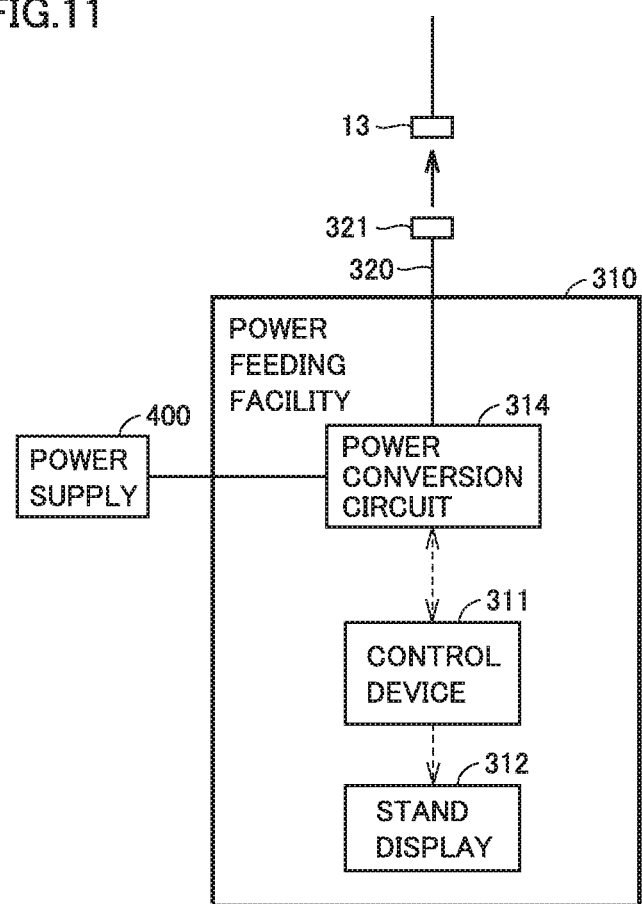
FIG. 11 illustrates a configuration of a third corresponding facility in a charging system according to a second embodiment of the present disclosure.

FIG. 11 illustrates a configuration of the third corresponding facility. Referring to FIG. 11, in the third corresponding facility, power supply 400 is an AC power supply having a voltage of 200 V. Main body 310 of the third corresponding facility further includes a power conversion circuit 314, in addition to the components shown in FIG. 1. Power conversion circuit 314 includes an AC/DC converter, a boosting circuit and a current adjustment circuit. The current adjustment circuit is configured to change an output current value of power conversion circuit 314. The current adjustment circuit may change the output current value by changing an electric resistance, or may change the output current value by changing a voltage. When power supply 400 includes a plurality of types of power supplies, the current adjustment circuit may change the output current value by changing a used power supply (i.e., a power supply electrically connected to power conversion circuit 314).

The third corresponding facility includes above-described power conversion circuit 314 and is configured to change a magnitude of electric power supplied to DC inlet 13. In the third corresponding facility, power conversion circuit 314 performs prescribed power conversion of AC power supplied from power supply 400 and outputs DC power having a voltage of 300 V to 400 V and a current of 10 A to 100 A to charging cable 320.

At the start of power feeding to vehicle 200, the third corresponding facility supplies DC power having a voltage of 400 V and a current of 100 A to DC inlet 13. When the third corresponding facility receives a prescribed signal (e.g., a current reduction request signal described below) from vehicle ECU 50 during power feeding to vehicle 200, the third corresponding facility reduces the electric power supplied to DC inlet 13 and causes stand display 312 to provide a notification that the DC my room mode is permitted. Since the notification that the DC my room mode is permitted is provided, a user of another vehicle can recognize that quick charging is not in execution in the third corresponding facility. When the user of the other vehicle wants to perform quick charging using the third corresponding facility, the user of the other vehicle can inform the driver of vehicle 200 to that effect and request the driver of vehicle 200 to move vehicle 200. Therefore, even if the DC my room mode is executed and the auxiliary device is driven during charging using the third corresponding facility, the convenience of the user of the other vehicle would not be excessively impeded. Stand display 312 according to the present embodiment corresponds to one example of "second notification device" according to the present disclosure.

Figure 12:
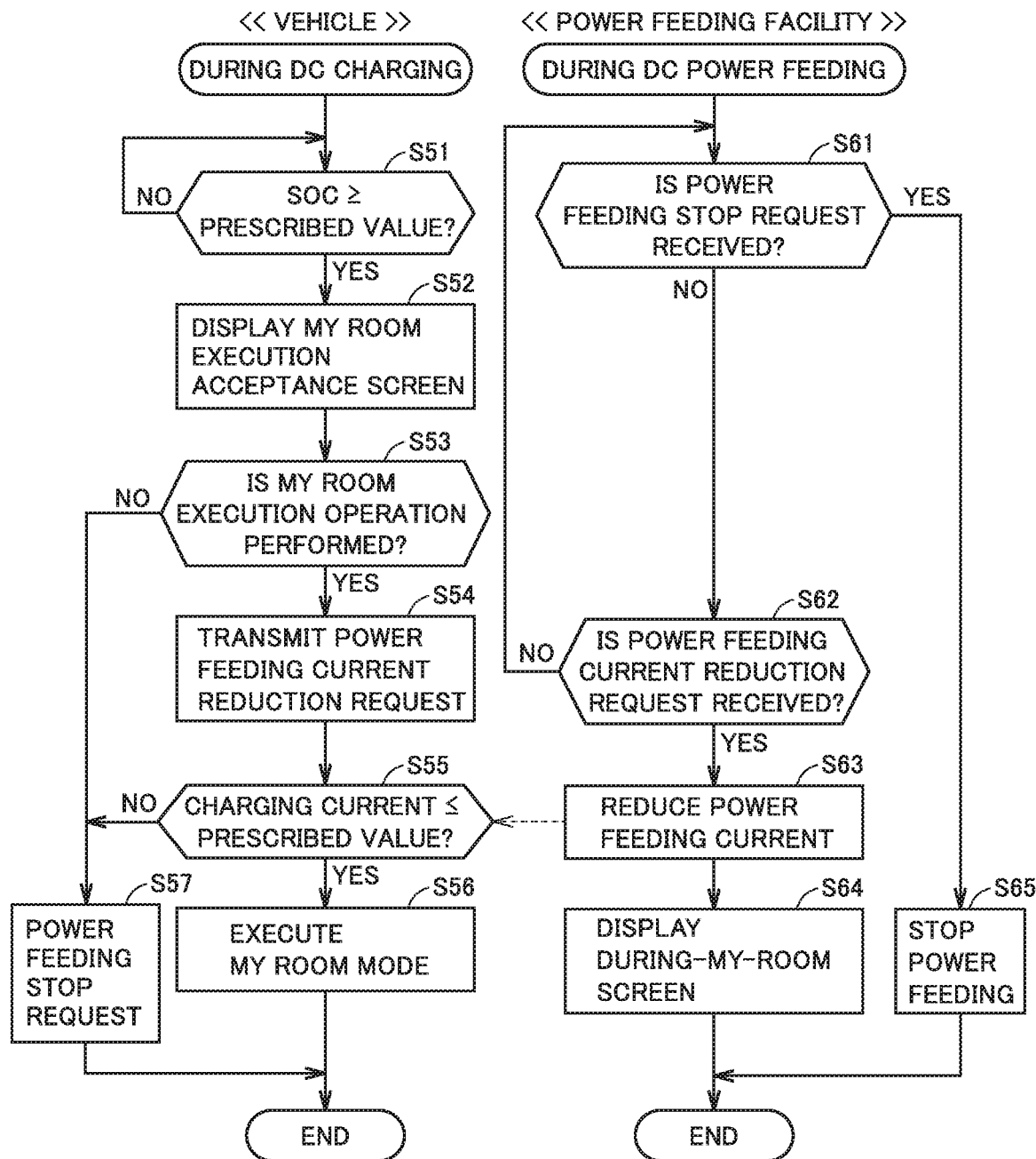
FIG. 12 is a flowchart showing a process procedure for each of DC my room mode execution/non-execution control executed by a vehicle-mountable control device and power feeding control executed in a power feeding facility in the charging system according to the second embodiment of the present disclosure.

FIG. 12 is a flowchart showing a process procedure for each of DC my room mode execution/non-execution control executed by vehicle ECU 50 and power feeding control executed in the power feeding facility in the charging system according to the second embodiment. The process on the vehicle 200 side shown in FIG. 12 is started, for example, when charging of driving battery 71 is started (refer to S15 in FIG. 4). On the other hand, the process on the power feeding facility side shown in FIG. 12 is started, for example, when power feeding is started (refer to S24 in FIG. 4). Description will be given below of the case in which the target facility is the above-described third corresponding facility (see FIG. 11).

Referring to FIG. 12 together with FIG. 1, in S51, vehicle ECU 50 determines whether or not the SOC of driving battery 71 charged with electric power supplied from the target facility to DC inlet 13 becomes not less than a prescribed SOC value. The prescribed SOC value corresponds to a threshold value for determining whether or not driving battery 71 is sufficiently charged. The prescribed SOC value is, for example, not less than 50%, and may be selected from the range of not less than 50% and not more than 100%. In the present embodiment, the prescribed SOC value is 100% (fully charged state). While the SOC of driving battery 71 is less than the prescribed SOC value (e.g., 100%) (i.e., during a time period in which determination of NO is made in S51), the process in S51 is repeatedly performed at every prescribed control cycle.

When the SOC of driving battery 71 becomes not less than the prescribed SOC value (YES in S51), vehicle ECU 50 causes notification device 220 (e.g., meter panel D1) to display the my room execution acceptance screen (e.g., see FIG. 9) in S52, and determines whether or not the my room execution operation is performed by the user within a prescribed time period in S53. Since S52 and S53 are the same as S42 and S43 in FIG. 8, respectively, description will not be repeated. When the my room execution operation is not performed (NO in S53), vehicle ECU 50 transmits a signal for requesting the stop of power feeding (hereinafter, also referred to as "power feeding stop request signal") to the target facility through charging cable 320 in S57, and then, ends the process on the vehicle 200 side in FIG. 12. On the other hand, when the my room execution operation is performed (YES in S53), vehicle ECU 50 transmits a signal for requesting reduction of the power feeding current to be not more than a prescribed current value (e.g., 15 A) (hereinafter, also referred to as "current reduction request signal") to the target facility through charging cable 320 in S54, and then, the process proceeds to S55.

On the other hand, when power feeding starts, control device 311 of the target facility determines in S61 whether or not the power feeding stop request signal (S57) is received from vehicle 200. When the power feeding stop request signal is not received (NO in S61), control device 311 of the target facility determines in S62 whether or not the current reduction request signal (S54) is received from vehicle 200. Until the reception of one of the power feeding stop request signal and the current reduction request signal is recognized (i.e., during a time period in which determination of NO is made in both S61 and S62), the processes in S61 and S62 are repeatedly performed at every prescribed control cycle.

When the power feeding stop request signal is received (YES in S61), control device 311 of the target facility stops power feeding to vehicle 200 in S65, and then, ends the process on the power feeding facility side in FIG. 12. Since S65 is the same as S26 in FIG. 4, description will not be repeated.

When the current reduction request signal is received (YES in S62), control device 311 of the target facility reduces the output current value to 10 A by power conversion circuit 314 in S63. As a result, the electric power supplied from the target facility to DC inlet 13 is reduced. Thereafter, in S64, control device 311 causes stand display 312 to provide the notification that the DC my room mode is permitted. If the DC my room mode is not permitted, the DC my room mode cannot be executed, and thus, the notification that the DC my room mode is permitted includes a notification that the DC my room mode is in execution.

Figure 13:
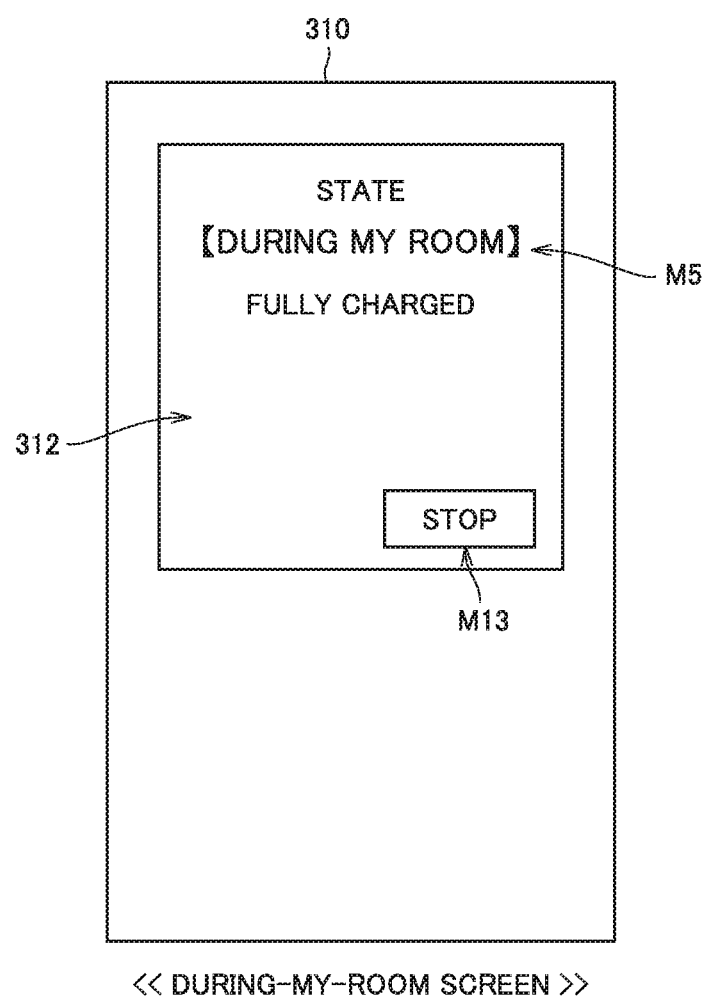
FIG. 13 shows one example of a during-my-room screen displayed to provide a notification that the DC my room mode is permitted, in the charging system according to the second embodiment of the present disclosure.

FIG. 13 shows one example of a during-my-room screen displayed on stand display 312 to provide the notification that the DC my room mode is permitted.

Referring to FIG. 13 together with FIG. 12, a message M5 including the characters of "during my room" is, for example, displayed on stand display 312 to thereby notify the user that the DC my room mode is permitted. STOP button M13 shown in FIG. 13 is the same as STOP button M13 on the during-power-feeding screen (FIG. 6).

As a result of the process in S64 above, the screen displayed on stand display is switched from the during-power-feeding screen (FIG. 6) to the during-my-room screen (FIG. 13). After the process in S64, the process in FIG. 12 ends.

Referring again to FIG. 12, in S55, vehicle ECU 50 determines whether or not the charging current of driving battery 71 becomes not more than a prescribed value within a prescribed time period. The charging current of driving battery 71 is detected, for example, by the monitoring device of driving battery 71 and indicates a current value corresponding to the output current value of the target facility. The prescribed value used in S55 is, for example, less than 50 A, and may be selected from the range of not less than 1 A and not more than 25 A. In the present embodiment, the prescribed value used in S55 is 15 A. In addition, the prescribed time period used in S55 is determined in consideration of the time required for the target facility (e.g., the third corresponding facility) to reduce the power feeding current in S63. When the target facility is the third corresponding facility, the output current value of the target facility is reduced to 10 A in accordance with the above-described current reduction request signal (S63) and the charging current of driving battery 71 becomes not more than 15 A within the prescribed time period. Therefore, determination of YES is made in S55.

When determination of YES is made in S55, vehicle ECU 50 executes the DC my room mode in S56, and then, ends the process on the vehicle 200 side in FIG. 12. Since S56 is the same as S44 in FIG. 8, description will not be repeated.

When the target facility is the power feeding facility that does not correspond to the DC my room mode (e.g., the above-described non-corresponding facility), the target facility cannot reduce the output current value even when the current reduction request signal is received. Therefore, the output current value of the target facility is maintained at 125 A. Thus, determination of NO is made in S55. Thereafter, vehicle ECU 50 transmits the power feeding stop request signal to the target facility through charging cable 320 in S57, and then, ends the process on the vehicle 200 side in FIG. 12.

When the target facility is the above-described first or second corresponding facility, the output current value of the target facility is 10 A from the beginning. Therefore, determination of YES is made in S55 and the DC my room mode is executed in S56.

In the present embodiment, the electric power supplied from the target facility to vehicle 200 corresponds to one example of "facility information" according to the present disclosure.

As described above, vehicle ECU 50 (vehicle-mountable control device) according to the present embodiment includes a determination unit and an information obtainment unit described below. The information obtainment unit is configured to obtain the prescribed facility information about the power feeding facility (S55 in FIG. 12). The determination unit is configured to permit the DC my room mode when it is determined that the power feeding facility corresponds to the DC my room mode based on the above-described facility information, and not permit the DC my room mode when it is determined that the power feeding facility does not correspond to the DC my room mode based on the above-described facility information (S55 to S57 in FIG. 12). As a result, the convenience of the user of the vehicle can be improved without excessively impeding the convenience of a user of another vehicle.

Vehicle ECU 50 further includes a request unit (S54 in FIG. 12) configured to request the power feeding facility to decrease the magnitude of the electric power supplied by the power feeding facility to be not more than the prescribed magnitude, when the prescribed request condition (YES in S51 and YES in S53 in FIG. 12) is satisfied, the prescribed request condition including a condition that the SOC of driving battery 71 becomes not less than the prescribed SOC value during charging of driving battery 71 mounted on vehicle 200 with electric power supplied from the power feeding facility to DC inlet 13. Therefore, the electric power supplied from the power feeding facility to vehicle 200 decreases when driving battery 71 is fully charged, and thus, overcharging of driving battery 71 is suppressed. "Request unit" is implemented by, for example, processor 51 and the programs executed by processor 51.

In the charging system according to the present embodiment, vehicle ECU 50 is configured to transmit the prescribed signal to the power feeding facility (S54 in FIG. 12), when the prescribed transmission condition (YES in S51 and YES in S53 in FIG. 12) is satisfied. In addition, the third corresponding facility is configured to cause stand display 312 to provide the notification that the DC my room mode is permitted, when the third corresponding facility receives the above-described prescribed signal from vehicle ECU 50 (YES in S62 in FIG. 12). Since the notification that the DC my room mode is permitted is provided, a user of another vehicle can recognize that quick charging is not in execution in the third corresponding facility. In the present embodiment, the above-described request condition and the above-described transmission condition are identical to each other. However, the request condition and the transmission condition can be independently changed within a range including the condition that the SOC of the battery mounted on the vehicle (e.g., driving battery 71) becomes not less than the prescribed SOC value during charging. In addition, any other notification device may be used instead of stand display 312.

Vehicle ECU 50 further includes an execution unit (S56 in FIG. 12) configured to execute the DC my room mode, when execution of the DC my room mode is requested as a result of the my room execution operation (YES in S53 in FIG. 12) and the DC my room mode is permitted (YES in S55 in FIG. 12). When the DC my room mode is executed, electric component 230 enters the drivable state. As a result, the convenience of the user of the vehicle can be improved without excessively impeding the convenience of a user of another vehicle.

Other Embodiments

The facility information can be arbitrarily set as long as the facility information indicates whether or not the power feeding facility corresponds to the DC my room mode. For example, information indicating whether the power feeding facility is a public facility or a non-public facility may be used as the facility information. The charging system may include a power feeding facility (i.e., a fourth corresponding facility corresponding to the DC my room mode) described below.

The fourth corresponding facility is a non-public facility having the configuration shown in FIG. 1, and control device 311 is configured to transmit information indicating that the power feeding facility (fourth corresponding facility) is a non-public facility to the vehicle in S22 in FIG. 4, for example. The number of users of the non-public facility is small. Therefore, even if the DC my room mode is permitted for the non-public facility, the possibility of impeding the convenience of a user of another vehicle would be low.

Vehicle ECU 50 according to the first embodiment may be configured to determine that the power feeding facility corresponds to the DC my room mode (YES in S31 in FIG. 7) when the power feeding facility is a non-public facility (e.g., when the above-described information indicating that the power feeding facility is a non-public facility is received from the target facility). Such vehicle ECU 50 determines that the target facility corresponds to the DC my room mode, for example, when the target facility is the fourth corresponding facility.

For example, vehicle ECU 50 may be configured to determine that the target facility corresponds to the DC my room mode (YES in S31 in FIG. 7), when at least one of a first requirement and a second requirement is satisfied, the first requirement being a requirement that a magnitude (e.g., an output current value) of electric power supplied by the target facility is not more than a prescribed magnitude (e.g., 15 A), the second requirement being a requirement that the target facility is a non-public facility. Vehicle ECU 50 may be configured to determine that the target facility does not correspond to the DC my room mode (NO in S31 in FIG. 7), when both of the first and second requirements are not satisfied. Alternatively, vehicle ECU 50 may, for example, be configured to determine that the target facility corresponds to the DC my room mode (YES in S31 in FIG. 7), when both of the first and second requirements are satisfied, and determine that the target facility does not correspond to the DC my room mode (NO in S31 in FIG. 7), when at least one of the first and second requirements is not satisfied. Each of the first and second corresponding facilities satisfies the first requirement, and each of the second and fourth corresponding facilities satisfies the second requirement.

In a charging system in which the power feeding facility is provided with an information indicator configured to display the facility information (i.e., information about the power feeding facility), vehicle ECU 50 may, for example, be configured to control a camera (not shown) provided in the front or at the back of the vehicle and read the facility information from the information indicator of the power feeding facility. Examples of the information indicator include a label or an FPD (Flat Panel Display). Any display method may be used in the information indicator, and the information may be displayed in the form such as a matrix-type two-dimensional code (e.g., a QR code (registered trademark)), a one-dimensional code (e.g., a barcode), a character string, or a numerical string.

Electric component 230 configured to enter the drivable state as a result of execution of the DC my room mode can be arbitrarily set. For example, electric component 230 may include at least one of an audio device, a video device, a seat heater, and a mirror heater, in addition to or instead of at least one of the navigation system and the air conditioner. The audio device is a device configured to reproduce or record or convert sound. Examples of the audio device include a car stereo and a car radio. The video device is a device configured to display or record an image (including a still image). Examples of the video device include a video reproducing device configured to reproduce a moving image recorded on various optical media or hard discs. The seat heater is a device configured to warm a seat (e.g., a driver's seat or a passenger's seat) in the vehicle cabin. The mirror heater is a device configured to heat a mirror (e.g., a door mirror) of the vehicle to remove raindrops or frost, for example.

The power feeding execution operation and the power feeding stop operation can be arbitrarily set. When the user knows how to operate the power feeding facility, the power feeding facility does not necessarily need to display the power feeding start screen and the during-power-feeding screen. Various messages (e.g., explanation of how to operate the power feeding facility) described on a piece of paper or a label may be attached to the main body of the power feeding facility.

A circuit configuration in the charging system is not limited to the configuration shown in FIG. 1 and can be changed as appropriate. For example, DC charging circuit and auxiliary battery 72 may be electrically connected to each other without driving battery 71 being interposed, such that electric power of the power feeding facility is supplied to auxiliary battery 72 without passing through driving battery 71 during execution of the DC my room mode. Alternatively, DC charging circuit 12 and electric component 230 may be electrically connected to each other without the batteries (e.g., driving battery 71 and auxiliary battery 72) being interposed, such that electric power of the power feeding facility is supplied to electric component 230 without passing through the batteries during execution of the DC my room mode.

Although the vehicle includes only one DC charging port in the above-described embodiment, the number and type of charging ports are not limited thereto. For example, the vehicle may include two or more DC charging ports, or may include an AC charging port in addition to the DC charging port.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A vehicle-mountable control device configured to control a vehicle including a charging port for DC power and an auxiliary device, the vehicle-mountable control device comprising:
   a determination unit configured to determine whether or not to permit an auxiliary device driving mode, the auxiliary device driving mode being a mode of bringing a prescribed auxiliary device into a drivable state when a power feeding facility external to the vehicle is connected to the charging port for DC power through a charging cable; and
   an information obtainment unit configured to obtain prescribed facility information about the power feeding facility,
   the determination unit being configured
   to permit the auxiliary device driving mode when it is determined that the power feeding facility corresponds to the auxiliary device driving mode based on the facility information, and
   not to permit the auxiliary device driving mode when it is determined that the power feeding facility does not correspond to the auxiliary device driving mode based on the facility information.

2. The vehicle-mountable control device according to claim 1, wherein
   the facility information includes a magnitude of electric power supplied by the power feeding facility, and
   the determination unit is configured to determine that the power feeding facility corresponds to the auxiliary device driving mode, when the magnitude of electric power supplied by the power feeding facility is not more than a prescribed magnitude.

3. The vehicle-mountable control device according to claim 2, further comprising
   a request unit configured to request the power feeding facility to decrease the magnitude of the electric power supplied by the power feeding facility to be not more than the prescribed magnitude, when an SOC of a battery mounted on the vehicle becomes not less than a prescribed SOC value during charging of the battery with the electric power supplied from the power feeding facility to the charging port for DC power.

4. The vehicle-mountable control device according to claim 1, wherein
   the facility information includes information indicating whether the power feeding facility is a public facility or a non-public facility, and
   the determination unit is configured to determine that the power feeding facility corresponds to the auxiliary device driving mode, when the power feeding facility is the non-public facility.

5. The vehicle-mountable control device according to claim 1, wherein
   the vehicle further includes a first notification device configured to provide prescribed information, and
   the vehicle-mountable control device further includes a notification unit configured to cause the first notification device to provide a notification that the auxiliary device driving mode cannot be executed, when the determination unit determines not to permit the auxiliary device driving mode.

6. The vehicle-mountable control device according to claim 1, wherein
   the prescribed auxiliary device includes at least one of an air conditioner, an audio device, a video device, a navigation system, a seat heater, and a mirror heater, and
   the vehicle-mountable control device further includes an execution unit configured to execute the auxiliary device driving mode, when execution of the auxiliary device driving mode is requested and the auxiliary device driving mode is permitted.

7. A charging system comprising:
   a corresponding facility;
   a vehicle-mountable control device configured to control a vehicle including a charging port for DC power and an auxiliary device, the vehicle-mountable control device comprising:
      a determination unit configured to determine whether or not to permit an auxiliary device driving mode, the auxiliary device driving mode being a mode of bringing a prescribed auxiliary device into a drivable state when a power feeding facility external to the vehicle is connected to the charging port for DC power through a charging cable; and
      an information obtainment unit configured to obtain prescribed facility information about the power feeding facility,
      the determination unit being configured
      to permit the auxiliary device driving mode when it is determined that the power feeding facility corresponds to the auxiliary device driving mode based on the facility information, and
      not to permit the auxiliary device driving mode when it is determined that the power feeding facility does not correspond to the auxiliary device driving mode based on the facility information,
   wherein the vehicle-mountable control device being configured to transmit a prescribed signal to the power feeding facility when a prescribed transmission condition is satisfied, wherein the corresponding facility being the power feeding facility corresponding to the auxiliary device driving mode, the corresponding facility including a second notification device configured to provide prescribed information, the corresponding facility being configured to cause the second notification device to provide a notification that the auxiliary device driving mode is permitted, when receiving the prescribed signal from the vehicle-mountable control device.

8. The charging system according to claim 7, wherein
the transmission condition includes a condition that an SOC of a battery mounted on the vehicle becomes not less than a prescribed SOC value during charging of the battery with electric power supplied from the power feeding facility to the charging port for DC power,
the corresponding facility is configured to change a magnitude of the electric power supplied to the charging port for DC power, and
the corresponding facility is configured to reduce the electric power supplied to the charging port for DC power, when receiving the prescribed signal from the vehicle-mountable control device.

9. A charging system comprising:
a corresponding facility;
a vehicle-mountable control device configured to control a vehicle including a charging port for DC power and an auxiliary device, the vehicle-mountable control device comprising:

a determination unit configured to determine whether or not to permit an auxiliary device driving mode, the auxiliary device driving mode being a mode of bringing a prescribed auxiliary device into a drivable state when a power feeding facility external to the vehicle is connected to the charging port for DC power through a charging cable; and an information obtainment unit configured to obtain prescribed facility information about the power feeding facility, the determination unit being configured
to permit the auxiliary device driving mode when it is determined that the power feeding facility corresponds to the auxiliary device driving mode based on the facility information, and
not to permit the auxiliary device driving mode when it is determined that the power feeding facility does not correspond to the auxiliary device driving mode based on the facility information, wherein the corresponding facility being the power feeding facility corresponding to the auxiliary device driving mode, the corresponding facility including an AC power supply configured to be supplied with electric power from a power grid, and a power conversion circuit configured to convert AC power output from the AC power supply to DC power and output the DC power.

* * * * *